(12) United States Patent
Wang

(10) Patent No.: US 9,651,150 B2
(45) Date of Patent: May 16, 2017

(54) CONTINUOUSLY VARIABLE TRANSMISSION CONTROL SYSTEM FOR VEHICLE

(71) Applicant: Kanzaki Kokyukoki Mfg. Co., Ltd., Amagasaki, Hyogo (JP)

(72) Inventor: Hongkun Wang, Hyogo (JP)

(73) Assignee: KANZAKI KOKYUKOKI MFG. CO., LTD., Amagasaki, Hyogo (JP)

( * ) Notice: Subject to any disclaimer, the term of this patent is extended or adjusted under 35 U.S.C. 154(b) by 30 days.

(21) Appl. No.: 14/724,263

(22) Filed: May 28, 2015

(65) Prior Publication Data

US 2015/0345630 A1   Dec. 3, 2015

(30) Foreign Application Priority Data

May 28, 2014   (JP) .................................. 2014-110425

(51) Int. Cl.
*F16H 59/48* (2006.01)
*F16H 61/662* (2006.01)
(Continued)

(52) U.S. Cl.
CPC ......... *F16H 61/66236* (2013.01); *F16H 9/16* (2013.01); *F16H 59/48* (2013.01);
(Continued)

(58) Field of Classification Search
CPC ......... Y10T 477/6237; Y10T 477/6242; Y10T 477/692; F16H 2061/66204; F16H 59/48;
(Continued)

(56) References Cited

U.S. PATENT DOCUMENTS

| 4,246,807 A | * | 1/1981 | Kofink | ................. B60W 10/06 474/18 |
| 4,659,321 A | * | 4/1987 | Miyawaki | ........ F16H 61/66259 474/28 |

(Continued)

FOREIGN PATENT DOCUMENTS

| JP | 05203005 A | | 8/1993 |
| JP | 2010159884 A | * | 7/2010 |

OTHER PUBLICATIONS

English translation of JP2010159884A; translationportal.epo.org; Aug. 25, 2016.*

*Primary Examiner* — Roger Pang
(74) *Attorney, Agent, or Firm* — Cantor Colburn LLP

(57) ABSTRACT

A continuously variable transmission control system for a vehicle has a continuously variable transmission device having a belt which is bridged over a driving pulley on a motive power source side and a driven pulley on a wheel side, and an electricity-driven actuator that moves a moveable sheave of at least one of the driving pulley and the driven pulley in the axial direction, to change a width between the moveable sheave and a fixed sheave, a control device that controls driving of the electricity-driven actuator, and an acceleration operation detection unit that detects an operation state of an acceleration operation unit. The control device moves the moveable sheave in the axial direction using the electricity-driven actuator so that a reduction ratio of the continuously variable transmission device is reduced as an amount of operation of the acceleration operation unit is increased at least in a predetermined operation amount range.

4 Claims, 17 Drawing Sheets

(51) Int. Cl.
  *F16H 9/16* (2006.01)
  *F16H 63/06* (2006.01)
  *B60W 10/105* (2012.01)
  *F16H 59/18* (2006.01)
  *B60W 10/107* (2012.01)
  *F16H 59/20* (2006.01)

(52) U.S. Cl.
  CPC ..... *F16H 61/66259* (2013.01); *F16H 63/062* (2013.01); *B60W 10/105* (2013.01); *B60W 10/107* (2013.01); *B60W 2520/04* (2013.01); *B60W 2540/10* (2013.01); *B60W 2550/142* (2013.01); *F16H 59/18* (2013.01); *F16H 59/20* (2013.01); *F16H 2061/66204* (2013.01); *Y10T 477/6237* (2015.01); *Y10T 477/6242* (2015.01); *Y10T 477/692* (2015.01)

(58) Field of Classification Search
  CPC ...... F16H 59/18; F16H 59/20; B60W 10/105; B60W 10/107; B60W 2550/142; B60W 2520/04; B60W 2540/10
  USPC .......................................................... 701/65
  See application file for complete search history.

(56) References Cited

U.S. PATENT DOCUMENTS

| | | | | |
|---|---|---|---|---|
| 5,088,352 | A  * | 2/1992 | Ishimaru | ............... F16H 37/021 474/28 |
| 6,086,506 | A  * | 7/2000 | Petersmann | ........ F16H 61/0213 477/45 |
| 2001/0053731 | A1* | 12/2001 | Ibamoto | ........... F16H 61/66254 477/46 |
| 2007/0219048 | A1* | 9/2007 | Yamaguchi | ....... F16H 61/66259 477/109 |
| 2008/0179126 | A1* | 7/2008 | Unno | ................ F16H 61/66259 180/230 |
| 2011/0277577 | A1* | 11/2011 | Roberge | ................ B60W 10/06 74/473.1 |
| 2015/0073671 | A1* | 3/2015 | Inoue | ..................... F16H 59/50 701/54 |

* cited by examiner

CONTINUOUSLY VARIABLE TRANSMISSION CONTROL SYSTEM FOR VEHICLE

CROSS REFERENCE TO RELATED APPLICATIONS

The present invention claims priority under 35 U.S.C. §119 to Japanese Application No. 2014-110425 filed May 28, 2014, the entire content of which is incorporated herein by reference.

BACKGROUND

Technical Field

The present invention relates to a continuously variable transmission control system for a vehicle having a continuously variable transmission device having a belt bridged between a driving pulley and a driven pulley and an electricity-driven actuator, and a control device that controls driving of the actuator.

Related Art

In the related art, a structure is known in which a belt type continuously variable transmission device is incorporated in a motive power transmitting mechanism that transmits motive power of a motive power source of a vehicle to a wheel. In the belt type continuously variable transmission device, a belt is bridged between a driving pulley on the side of the motive power source in the motive power transmission direction and a driven pulley on the side of the wheel. Of the driving pulley and the driven pulley, at least one pulley includes a fixed sheave and a moveable sheave which is moveable in an axial direction. As the belt type continuously variable transmission device, there is known an electrically-driven structure in which the moveable sheave is moved by an electricity-driven actuator.

JP H5-203005 A discloses a transmission device in which the fixed sheave of the driving pulley is fixed on a rotational shaft through which a torque of the motor is taken out, and the moveable sheave is placed to oppose the fixed sheave. A centrifugal weight is provided between a cam plate which rotates synchronously with the moveable sheave and the moveable sheave, and moves so as to move the moveable sheave toward the fixed sheave by an action of a centrifugal force.

In the structure described in JP H5-203005 A, because the centrifugal weight does not move so as to move the moveable sheave toward the fixed sheave until a rotational speed of the rotational shaft is increased to a predetermined speed, a reduction ratio in the transmission device is maintained at a constant. Because of this, even when the vehicle starts to move, a state of a high reduction ratio is maintained until a predetermined vehicle speed which is relatively high, and thus, there is still room for improvement from the viewpoint of improvement of the fuel consumption. In addition, in the structure of JP H5-203005 A, a degree of freedom in adjustment of the reduction ratio is low, and there is also room for improvement from the viewpoint of increasing the degree of freedom of setting the acceleration characteristic.

An advantage of the present invention is in the provision of a continuously variable transmission control system for a vehicle that can improve the fuel consumption of the vehicle to which the belt type continuously variable transmission device is incorporated, and which can also increase the degree of freedom of setting the acceleration characteristic.

SUMMARY

According to one aspect of the present invention, there is provided a continuously variable transmission control system for a vehicle, comprising: a continuously variable transmission device having a belt bridged over a driving pulley on a side of a motive power source and a driven pulley on a side of a wheel, and an electricity-driven actuator that moves a moveable sheave of at least one of the driving pulley and the driven pulley in the axial direction, to change a width between the moveable sheave and a fixed sheave; a control device that controls driving of the electricity-driven actuator; and an acceleration operation detection unit that detects an operation state of an acceleration operation unit, wherein the control device moves the moveable sheave in the axial direction using the electricity-driven actuator so that a reduction ratio of the continuously variable transmission device is reduced as an amount of operation of the acceleration operation unit is increased at least in a predetermined operation amount range.

DESCRIPTION OF EXEMPLARY EMBODIMENTS

Figure 1:
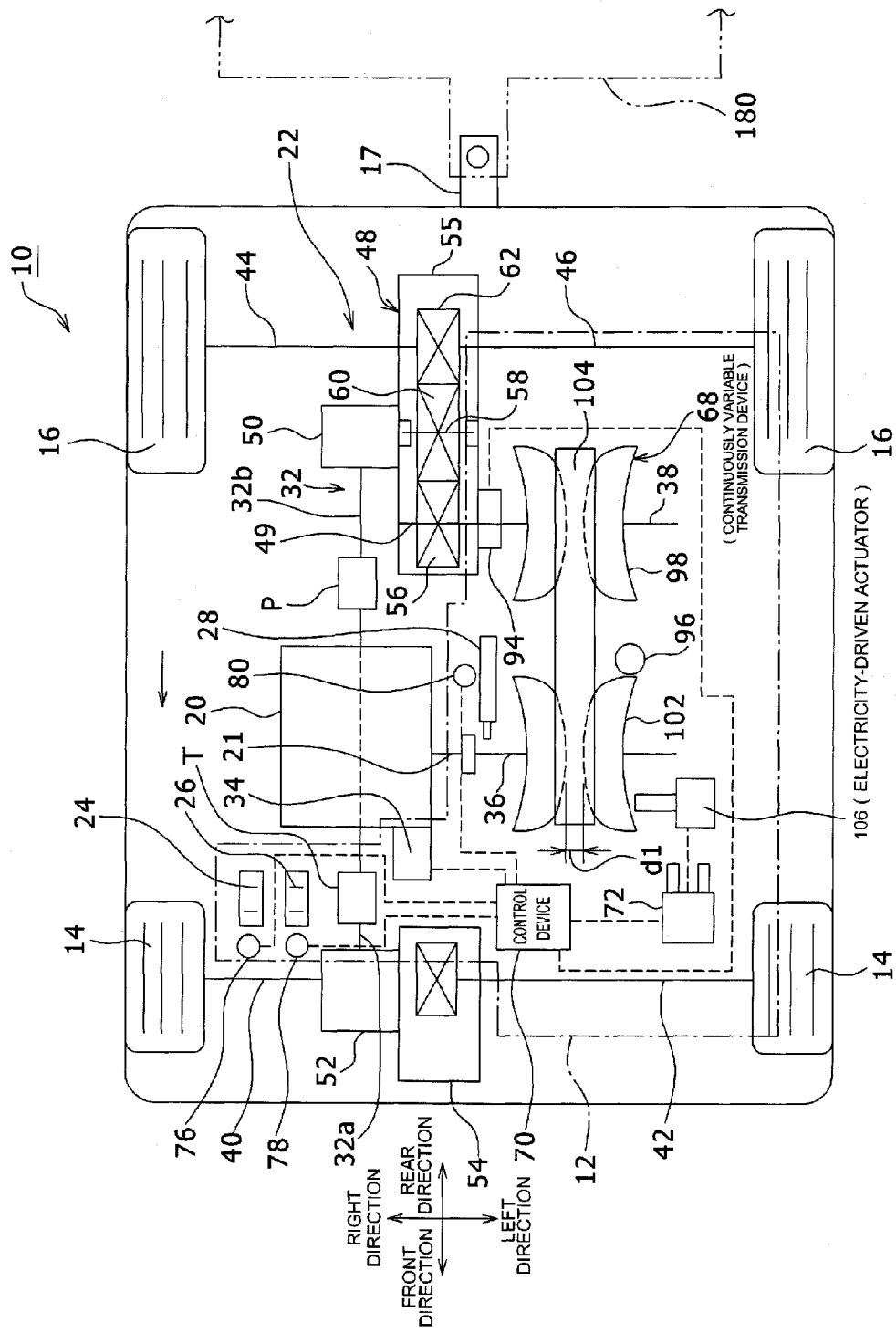
FIG. 1 is a schematic diagram showing an overall structure of a vehicle equipped with a continuously variable transmission control system for a vehicle according to a preferred embodiment of the present invention.

A preferred embodiment of the present invention will now be described in detail with reference to the drawings. In the following, a configuration will be described in which a vehicle equipped with a continuously variable transmission control system for a vehicle has a towing member which is a working member for executing a towing operation when necessary, but this configuration is merely exemplary. For example, the vehicle may be a vehicle which does not have the towing member, such as an off-road vehicle that travels on rough terrain such as wasteland and mountains, a work vehicle having a working machine that executes one or more tasks of snow removal, an excavation, public work, and farm work, or an off-road type utility vehicle having functions of both the off-road vehicle and the work vehicle. The drive method of the vehicle may be driving of only the front wheels, or driving of only the rear wheels. In the following description, similar elements over all of the drawings are assigned the same reference numerals for the description.

(Overall Structure of Vehicle)

Figure 2:
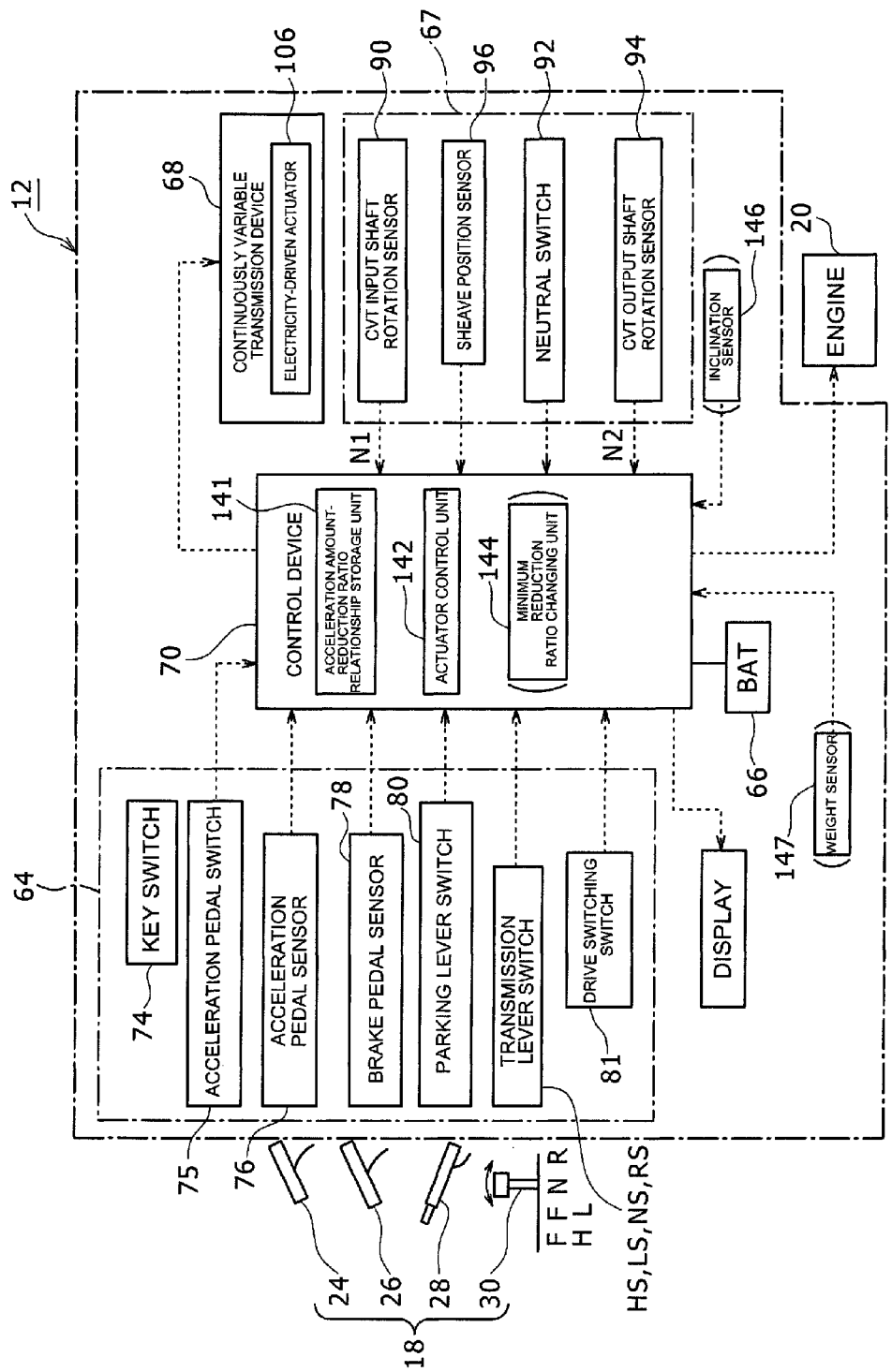
FIG. 2 is a block diagram showing a structure of the continuously variable transmission control system equipped in the vehicle of FIG. 1.

FIGS. 1-9 are diagrams showing a preferred embodiment of the present invention. FIG. 1 shows an overall structure of a vehicle 10 equipped with a continuously variable transmission control system 12 for a vehicle according to the present embodiment. FIG. 2 is a block diagram of a structure of the continuously variable transmission control system 12 equipped in the vehicle 10 of FIG. 1. As will be described below, the continuously variable transmission control system 12 includes a belt type continuously variable transmission device 68.

The vehicle 10 shown in FIG. 1 comprises a front wheel 14 and a rear wheel 16 which are wheels supported at the front and rear of a vehicle body, a group of operation elements 18 provided in a vehicle compartment and shown in FIG. 2, an engine 20 which is a motive power source, the continuously variable transmission control system 12, and a motive power transmitting mechanism 22. As shown in the drawings, a towing member 17, for example, for towing a trailer 180 may be provided on the vehicle 10, for example, using a hitch ball type engagement unit, when necessary The group of operation elements 18 includes an acceleration pedal 24 which is an acceleration operation unit and a brake pedal 26 which is a brake operation unit, provided on a front side of a driver's seat (not shown), a parking brake lever 28 which is a second brake operation unit provided around a center in a left-and-right direction of the vehicle 10 and which can be tilted and displaced in the up-and-down direction, a steering operator (not shown), and a speed change lever 30 which is a transmission command unit shown in FIG. 2.

The brake pedal 26 is connected to a master cylinder which supplies hydraulic pressure to a hydraulic brake device provided on one or both of the front wheel 14 and the rear wheel 16, and is configured to activate the brake device when stepped on by the user, to brake the wheel. The stepping on the brake pedal 26 is an operation of the user. The parking brake lever 28 is connected by a link or a wire to a brake maintaining device provided on one or both of the front wheel 14 and the rear wheel 16, and is configured to activate the brake maintaining device by being pulled up by the user and to brake or maintain the brake of the wheel. Alternatively, a center brake device which stops rotation of a propeller shaft 32 in connection with the parking brake lever 28 may be provided as the brake maintaining device at a position shown by P on the propeller shaft 32 of FIG. 1, which will be described later. The steering operator is constituted by, for example, a steering wheel, and is connected to the front wheel 14 in a manner to allow steering by a steering mechanism of an Ackerman type.

As shown in FIG. 2, the speed change lever 30 is supported on the vehicle body in a manner to be able to tilt and move in a front-and-rear direction so that an operation position of the lever can be switched among 4 positions, including an FH position which is a forward travel and high gear position, an FL position which is a forward travel and low gear position, an N position which is a neutral position, and an R position which is a reverse travel position. As the speed change lever 30, a structure which allows switching of the operation positions among 3 positions including an F position which is a forward travel position, an N position which is a neutral position, and an R position which is a reverse travel position, or a structure which allows switching of the operation position among 2 positions or 5 or more positions may alternatively be employed.

The engine 20 is activated by an engine activation unit 34. As the engine 20, any of a plurality of types of engines including a gasoline engine and a diesel engine may be employed. Alternatively, a hybrid type structure may be employed having the engine 20, a power generator which is driven by the engine 20 and which generates electric power, and an electric motor which is driven by supplying the electric power generated by the power generator directly or through a battery.

An acceleration pedal sensor 76 which is an acceleration operation detection unit to be described later detects an amount of operation which is an operation state of the acceleration pedal 24, and transmits the detection signal to a control device 70. The control device 70 controls a throttle valve of the engine 20 so that a degree of opening of the throttle valve is increased as the amount of operation of the acceleration pedal 24 is increased. The amount of operation of the acceleration pedal 24 will hereinafter be described as "acceleration operation amount". Alternatively, a valve driving electric motor which drives the throttle valve may be provided, and the degree of opening of the throttle valve may be controlled by the control device 70 controlling driving of the valve driving electric motor. The rotational speed of the engine 20 is adjusted by the degree of opening of the throttle valve, and is increased as the degree of opening of the throttle valve is increased.

Alternatively, a configuration may be employed in which a drive unit of the throttle valve is connected to the acceleration pedal 24 by a link or a cable, and the degree of opening of the throttle valve is increased as the amount of operation of the acceleration pedal 24 is increased. In this case, as the acceleration pedal sensor 76, in place of a structure that directly detects a pedal position of the acceleration pedal 24, a structure may be employed which is provided near the throttle valve and which indirectly detects the pedal position of the acceleration pedal 24 by detecting the degree of opening of the throttle valve.

The control device 70 further controls a reduction ratio of the continuously variable transmission device 68 using an electricity-driven actuator 106 such that the reduction ratio of the continuously variable transmission device 68 is reduced as the acceleration operation amount indicated by the detected value of the acceleration pedal sensor 76 is increased, as will be described later. With such a configuration, as will be described later, the fuel consumption of the vehicle can be improved and the degree of freedom of setting the acceleration characteristic can be increased. Alternatively, as the motive power source, an electric motor for driving the wheel may be used in place of the engine 20.

The continuously variable transmission control system 12 varies speed of the motive power of a CVT input shaft 36 connected to an output shaft 21 of the engine 20 and outputs to a CVT output shaft 38. A detailed structure of the continuously variable transmission control system 12 will be described later. The CVT output shaft 38 is connected to a motive power transmitting mechanism 22. The motive power is transmitted through the motive power transmitting mechanism 22, and the front wheels 14 and/or the rear wheels 16 is/are rotationally driven.

The motive power transmitting mechanism 22 is provided on a motive power transmitting path on the side of the front wheel 14 and the rear wheel 16, receives an input of the motive power of the CVT output shaft 38 of the continuously variable transmission control system 12, and outputs the motive power to each of left and right front axles 40 and 42 connected to the front wheel 14 and the left and right rear axles 44 and 46 connected to the rear wheels 16. The motive power transmitting mechanism 22 includes a transmission gear device 48, the rear axles 44 and 46, a first motive power converting mechanism 50, the propeller shaft 32, a second motive power converting mechanism 52, a front-side differential gear device 54, and the front axles 40 and 42.

The transmission gear device 48 is configured to allow selection of a desired transmission gear stage by the user, by an operation of the speed change lever 30. More specifically, the transmission gear device 48 comprises a group of drive gears 56 placed around a first transmission shaft 49 in a case 55, a second transmission shaft 58 supported on the case 55 parallel to the first transmission shaft 49 and in a rotatable manner, a group of driven gears 60 placed around the second transmission shaft 58 in the case 55, and a rear-side differential gear device 62. The first transmission shaft 49 is fixed concentrically on the CVT output shaft 38. The group of drive gears 56 includes a drive-side high-speed gear, a drive-side low-speed gear, and a drive-side reverse travel gear, which are fixed on the first transmission shaft 49. The group of driven gears 60 includes a driven-side high-speed gear, a driven-side low-speed gear, and a driven-side reverse travel gear, which are placed relatively rotatable around the second transmission shaft 58. Each of the drive-side high-speed gear, the drive-side low-speed gear, the driven-side high-speed gear, and the driven-side low-speed gear are transmission gears.

The driven-side low-speed gear is engaged with the drive-side low-speed gear, and the driven-side high-speed gear is engaged with the drive-side high-speed gear. The driven-side reverse travel gear is engaged with the drive-side reverse travel gear through an intermediate gear fixed on a reverse travel gear shaft (not shown). In this case, a clutch slider (not shown) is placed around the second transmission shaft 58 and between the driven-side forward travel gear (low-speed gear or high-speed gear) and the driven-side reverse travel gear. The clutch slider is spline-engaged in a manner to be not relatively rotatable and in a manner to be slidable in the axial direction, on the second transmission shaft 58 or a spline hub fixed on the second transmission shaft 58. The clutch slider is connected to the speed change lever 30 through a clutch fork and a link mechanism (not shown).

When the clutch slider is moved in the axial direction due to an operation of the speed change lever 30, the clutch slider engages the driven-side forward travel gear or the driven-side reverse travel gear, and the driven-side forward travel gear or the driven-side reverse travel gear is fixed on the second transmission shaft 58.

In addition, a second clutch slider which is connected to the speed change lever 30 through a clutch fork and a link mechanism (not shown) is placed around the second transmission shaft 58 and between the driven-side low-speed gear and the driven-side high-speed gear. The second clutch slider is spline-engaged in a manner to be not relatively rotatable and in a manner to be slidable in the axial direction, on the second transmission shaft 58 or a spline hub fixed on the second transmission shaft 58.

The rear-side differential gear device 62 has an output gear which is engaged with an intermediate output gear fixed on the second transmission shaft 58, and a differential gear, transmits the rotation of the output gear to the left and right rear axles 44 and 46, and changes the rotations of the left and right rear axles 44 and 46 according to turning of the vehicle 10.

The first motive power converting mechanism 50 includes a plurality of gears, converts the rotation of the second transmission shaft 58 protruding from the case 55 into a rotation in a rotational direction about an axis of the vehicle 10 along the front-and-rear direction, and transmits the converted rotation to the propeller shaft 32. The propeller shaft 32 passes on a lower side of an engine 20, and is connected to the second motive power converting mechanism 52. The second motive power converting mechanism 52 includes a plurality of gears, converts the rotation of the propeller shaft 32 into a rotation in a rotational direction about an axis of the vehicle 10 along the left-and-right direction, and transmits the converted rotation to the front axle 40 and the input shaft of the front-side differential gear device 54. The front-side differential gear device 54 changes the rotation of the input shaft and the front axle 42 according to the turning of the vehicle. Alternatively, the front-side differential gear device 54 may be provided between the second motive power converting mechanism 52 and the front axle 42. In addition, the rotation of the output shaft of the second motive power converting mechanism 52 may be input to the front-side differential gear device 54, and the left and right front axles 40 and 42 may be connected as the output shaft to the front-side differential gear device 54.

With such a structure, the drive-side low-speed gear and the driven-side low-speed gear which are of a lower gear stage, and the drive-side high-speed gear and the driven-side high-speed gear which are of a higher gear stage, are selectively connected between a driven pulley 98 of the continuously variable transmission device 68 to be described later and the front wheels 14 and the rear wheels 16. For example, when the FL position indicating forward travel and low gear stage is selected by an operation of the user on the speed change lever 30, the clutch slider or the second clutch slider engages with the driven-side low-speed gear so that the drive-side low-speed gear and the driven-side low-speed gear are selectively connected between the driven pulley 98 and the front wheels 14 and the rear wheels 16. In this case, the vehicle 10 can be moved forward with a low gear stage. On the other hand, when the FH position indicating the forward travel and high gear stage is selected by the operation of the user on the speed change lever 30, the clutch slider or the second clutch slider engages the driven-side high-speed gear so that the drive-side high-speed gear and the driven-side high-speed gear are selectively connected between the driven pulley 98 and the front wheels 14 and the rear wheels 16. In this case, the vehicle 10 can be moved forward with a high gear stage. When the R position is selected, the clutch slider engages the driven-side reverse travel gear so that the vehicle can be moved in a reverse direction. When the N position is selected by displacing the speed change lever 30, the clutch slider is placed between the driven-side low-speed gear or the driven-side high-speed gear and the driven-side reverse travel gear, and a neutral state is achieved in which the clutch slider is not engaged with the any gear of the driven-side low-speed gear, the driven-side high-speed gear, or the driven-side reverse travel gear. In this case, the rotation of the CVT output shaft 38 is not transmitted to any of the front axles 40 and 42 or the rear axles 44 and 46. Because of this, even when the engine 20 is being driven, the vehicle 10 is in a drive stopped state.

The structure of the transmission gear device 48 is not limited to the above-described structure, and alternatively, various other structures may be employed. For example, in a configuration when only one stage can be selected as the forward travel side with the speed change lever 30, the drive-side high-speed gear and the driven-side high-speed gear may be omitted, and the drive-side low-speed gear and the driven-side low-speed gear may be used for forward travel.

In addition, although not shown in detail in the figures, the propeller shaft 32 is divided into a front-side shaft 32a and a rear-side shaft 32b, and a shaft connection switching mechanism T is provided between the front-side shaft 32a and the rear-side shaft 32b. The shaft connection switching mechanism T can be switched by control of the control device between a state where the two shafts 32a and 32b are connected to allow transmission of the motive power and a state where the two shafts 32a and 32b are separated so that the motive power cannot be transmitted. For example, the shaft connection switching mechanism T comprises a case which is supported on the vehicle body and which stores a connection section of the front-side shaft 32a and the rear-side shaft 32b, a fork shaft which is placed in the case in the front-and-rear direction parallel to the shafts 32a and 32b and which is supported to be moveable in the front-and-rear direction, a clutch slider which engages a spline provided on an outer circumference of each of the shafts 32a and 32b and which can be displaced in the front-and-rear direction, a shift fork which is engaged with the clutch slider and the fork shaft and which is supported in the case in a manner to allow tilting, and a drive switching actuator. The drive switching actuator comprises a switching electric motor which is attached on the case and which is controlled by the control device 70, and a nut-screw mechanism which includes a nut and a screw shaft and which converts the rotation of the switching electric motor to a displacement in the front-and-rear direction. When the switching electric motor rotates in one direction, the screw shaft connected to the rotational shaft of the switching electric motor rotates in one direction, and a member or a piston to which the nut is fixed and which does not rotate presses the fork shaft to one side in the front-and-rear direction and displaces the fork shaft. In this case, the clutch slider is displaced to the other side in the front-and-rear direction, the clutch slider is engaged with the two shafts 32a and 32b, the shafts 32a and 32b are connected in a manner to allow transmission of the motive power, and four-wheel drive travel is realized. On the other hand, when the switching electric motor is rotated in the other direction, the piston is displaced in a direction away from the fork shaft by the rotation of the screw shaft, and the fork shaft is displaced to the other side in the front-and-rear direction by a spring provided between the fork shaft and the case. In this case, the clutch slide is displaced to the one side in the front-and-rear direction, the engagements between the clutch slider and one of the shafts 32a and 32b is released, the transmission of the motive power to the two shafts 32a and 32b is discontinued, and two-wheel drive travel is realized. The control device 70 controls the drive switching actuator according to a switching command by the operation of a drive switching switch 81 to be described later, to switch the traveling state between the four-wheel drive travel and the two-wheel drive travel.

(Overall Structure of Continuously Variable Transmission Control System)

As shown in FIG. 2, the continuously variable transmission control system 12 comprises a group of operation-side sensor switches 64, a battery 66 which is a power supply, the engine activation unit 34 (FIG. 1), a group of drive-side sensor switches 67, the continuously variable transmission device 68, and the control device 70 which is called an ECU (Electronic Control Unit).

The group of operation-side sensor switches 64 includes a key switch 74 which is an activation command unit, an acceleration pedal switch 75, the acceleration pedal sensor 76, a brake pedal switch 78, a parking lever switch 80, speed change lever switches HS, LS, NS, and RS which are transmission operation detection units, and the drive switching switch 81.

The key switch 74 is switched between ON and OFF by manual operation by the user to insert a key and turn the key, and outputs a signal indicating the ON/OFF state to the control device 70. As the activation command unit, in place of the key switch 74, a switch which can be switched ON and OFF without the need of the key or a press button which is switched between ON and OFF every time the button is pressed may alternatively be employed.

The acceleration pedal switch 75 detects whether or not the acceleration pedal 24 is operated by the user, that is, whether or not the acceleration pedal is stepped on. The acceleration pedal switch 75 is switched ON when the acceleration pedal 24 is operated and is switched OFF when the acceleration pedal 24 is not operated, that is, when the acceleration pedal 24 is not stepped on. When the acceleration pedal 24 is stepped on, first, the acceleration pedal switch 75 is switched ON, and then the acceleration operation amount is detected by the acceleration pedal sensor 76.

The brake pedal switch 78 detects an operation state of the brake pedal 26 indicating whether or not the brake pedal 26 is operated by the user, that is, whether or not the brake pedal 26 is stepped on. The brake pedal switch 78 is switched ON when the brake pedal is operated by the user, and is switched OFF when the brake pedal 26 is not operated, that is, when the brake pedal 26 is not stepped on. In place of or in addition to the brake pedal switch 78, a sensor which measures an amount of depression of the brake pedal 26 may be employed, and the operation state of the brake pedal 26 may be detected with the sensor.

The parking lever switch 80 is switched ON when the parking brake lever 28 is operated to the upper side, and is switched OFF when the parking brake lever 28 is returned to the lower side. The speed change lever switches HS, LS, NS, and RS include a plurality of switches provided correspondingly to the plurality of the operation positions; that is, the FH, FL, N, and R positions, of the speed change lever 30, respectively. Each of the speed change lever switches HS, LS, NS, and RS is switched ON when the speed change lever 30 is operated to the corresponding operation position, and is switched OFF when the speed change lever 30 is operated to a different position, so that the operation position of the speed change lever 30 is detected.

Each of the speed change lever switches HS, LS, NS, and RS transmits a detection signal indicating respective ON/OFF state to the control device 70 as operation position signals indicating the operation position of the speed change lever 30. The acceleration pedal switch 75, the brake pedal switch 78, and the parking lever switch 80 transmit signals indicating respective ON/OFF states to the control device 70.

The drive switching switch 81 is provided to be operable by the user, and commands a drive state of the vehicle by the operation. Specifically, when the drive switching switch is operated, command is switched between command of the two-wheel drive travel of the vehicle and command of the four-wheel drive travel of the vehicle. A signal indicating the command of the drive switching switch 81 is transmitted to the control device 70. The signal indicating the command includes a switching command signal that commands switching between the two-wheel drive travel and the four-wheel drive travel. The control device 70 switches the travel state between the two-wheel drive travel and the four-wheel drive travel according to the switching command of the drive switching switch 81.

The battery 66 is connected to the control device 70 through a power feed relay (not shown). As the power supply, in place of the battery 66, a capacitor may be alternatively used. The power feed relay enables supply of power to the control device 70 by switching ON of the key switch 74. The engine activation unit 34 (FIG. 1) includes a cell motor. The control device 70 supplies electric power from the battery 66 to the cell motor when the key switch 74 is switched ON, to drive the engine activation unit 34 and activate the engine 20.

The group of drive-side sensor switches 67 includes a CVT input shaft rotation sensor 90 which is an engine rotation sensor, a neutral switch 92, a CVT output shaft rotation sensor 94, and a sheave position sensor 96 to be described later. The CVT input shaft rotation sensor 90 detects a rotational speed of an output shaft 21 of the engine 20 which rotates integrally with the CVT input shaft 36 as the CVT input shaft rotational speed N1, and transmits a signal indicating the rotational speed N1 to the control device 70. When a neutral state is set by the transmission gear device 48, the neutral switch 92 detects the establishment of the neutral state, and transmits the signal indicating the establishment to the control device 70. The CVT output shaft rotation sensor 94 detects a rotational speed of the CVT output shaft 38 which is an output shaft of the driven pulley 98 shown in FIG. 1, and transmits a signal indicating a detected value of the rotational speed to the control device 70. The driven pulley 98 shown in FIG. 1 is provided at the periphery of the CVT output shaft 38. The "rotational speed" also includes a meaning of a number of rotations which is a rotational speed per unit time, for example, per minute.

(Structure of Continuously Variable Transmission Device)

Figure 3:
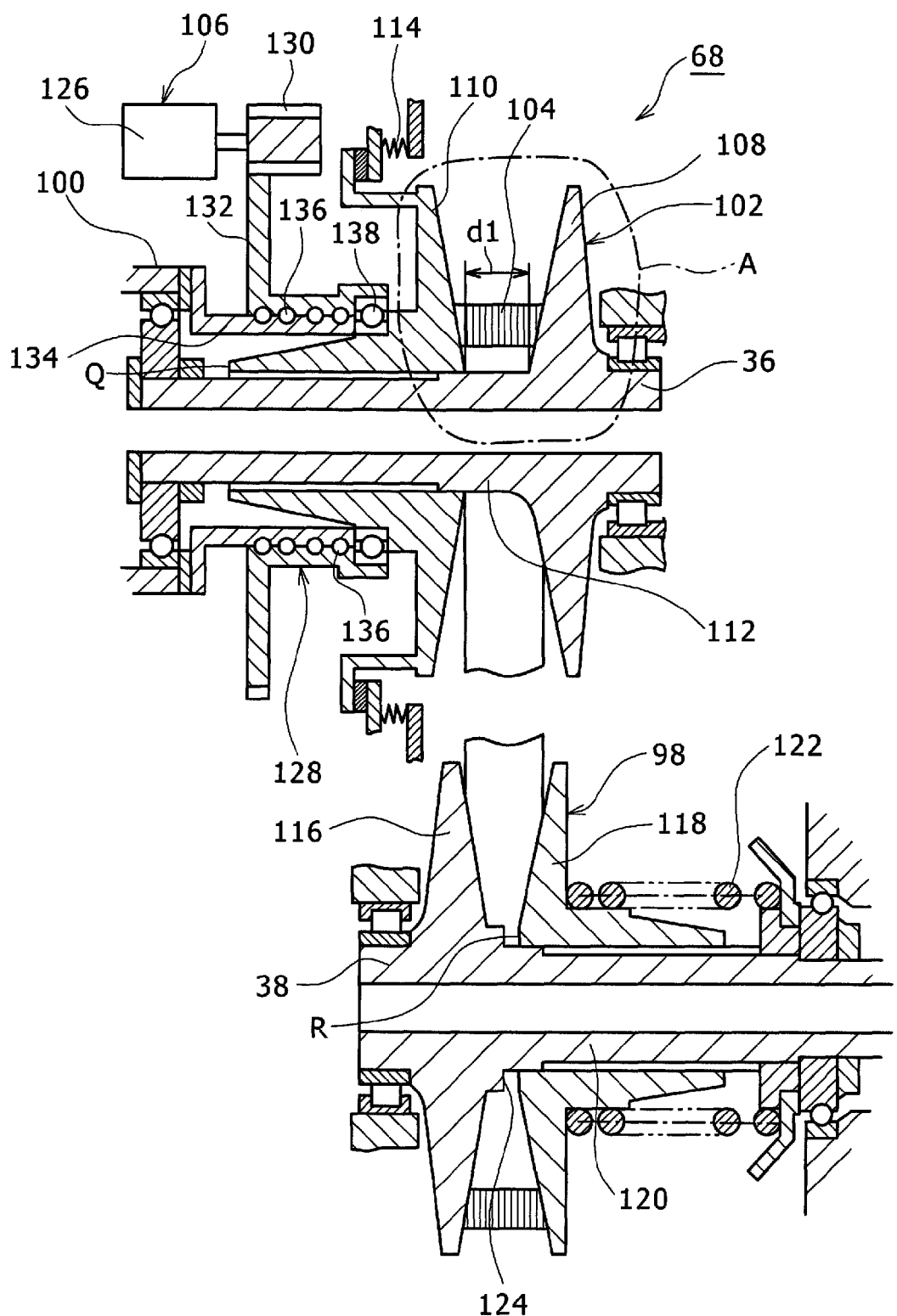
FIG. 3 is a cross sectional diagram of a continuously variable transmission device in the continuously variable transmission control system of FIG. 1 in a case where a maximum reduction ratio is realized at a startup position.

FIG. 3 is a cross sectional diagram showing of the belt type continuously variable transmission device 68 in a case where a maximum reduction ratio is realized. The continuously variable transmission device 68 includes the CVT input shaft 36 and the CVT output shaft 38 rotatably supported on a gearbox case 100, the driving pulley 102 provided on a radially outer side of the CVT input shaft 36, the driven pulley 98 on the side of the wheel and provided on a radially outer side of the CVT output shaft 38, a metal belt 104 bridged over the driving pulley 102 on the side of the engine 20 and the driven pulley 98, and the electricity-driven actuator 106. The continuously variable transmission device 68 is connected between the engine 20 and the front wheel 14 and the rear wheel 16 to allow transmission of motive power through the transmission gear device 48.

The CVT input shaft 36 is fixed concentrically with the output shaft 21 of the engine 20. The CVT output shaft 38 is placed in parallel with the CVT input shaft 36. The driving pulley 102 includes a first fixed sheave 108 and a first moveable sheave 110 provided in the gearbox case 100. The first fixed sheave 108 is integrally formed with an outer circumferential surface on one end of the CVT input shaft 36 to protrude in the radial direction. The first moveable sheave 110 is placed at the periphery of a shaft portion 112 of the CVT input shaft 36 to be moveable in the axial direction with respect to the first fixed sheave 108 and to be not relatively rotatable. A spring 114 is attached between the first moveable sheave 110 and the gearbox case 100 so that the first moveable sheave 110 is urged in a direction away from the first fixed sheave 108 in relation to the axial direction. The sheave position sensor 96 shown in FIGS. 1 and 2 detects an axial position of the first moveable sheave 110, and transmits a signal indicating the axial position to the control device 70.

The driven pulley 98 includes a second fixed sheave 116 and a second moveable sheave 118 provided in the gearbox case 100. The second fixed sheave 116 is integrally formed on an outer circumferential surface on one end of the CVT output shaft 38 to protrude in the radial direction. The second moveable sheave 118 is placed at the periphery of the shaft portion 120 of the CVT output shaft 38 in a manner to be moveable in the axial direction with respect to the second fixed sheave 116 and not relatively rotatable. The second moveable sheave 118 is urged by a spring 122 provided between the second moveable sheave 118 and the gearbox case 100 in a direction toward the second fixed sheave 116 in relation to the axial direction. With this structure, tension is applied from the driving pulley 102 and the driven pulley 98 to the belt 104, and the tension is maintained constant. The CVT output shaft 38 has on its outer circumferential surface a step surface 124 which is a movement restriction unit provided at a root portion of the second fixed sheave 116. The step surface 124 is positioned on a plane orthogonal to the axial direction of the CVT output shaft 38, and restricts the movement in the axial direction by one end of the second moveable sheave 118 hitting the step surface 124 when the second moveable sheave 118 moves toward the second fixed sheave 116. The movement restriction unit is not limited to such a structure, and any structure which is formed on the CVT output shaft 38 or on a member fixed on the CVT output shaft 38 and which restricts movement of the second moveable sheave 118 toward the second fixed sheave 116 may be employed.

The electricity-driven actuator 106 has an electric motor 126 which can be rotated in both directions, and a ball screw mechanism 128 which moves the first moveable sheave 110 in the axial direction in response to the rotation of the electric motor 126. The electric motor 126 is driven by a direct current supplied from the battery 66 through the control device 70. The ball screw mechanism 128 includes a small gear 130 fixed on the rotational shaft of the electric motor 126, an outer screw member 132 having, on an outer circumferential surface, a gear portion that engages the small gear 130, an inner screw member 134 placed on a radially inner side of the outer screw member 132, and a plurality of balls 136 placed between the inner screw member 134 and the outer screw member 132. The inner screw member 134 is fixed on the gearbox case 100. The plurality of balls 136 are placed between a helical groove on an inner circumferential surface of the outer screw member 132 and a helical groove on an outer circumferential surface of the inner screw member 134. A bearing 138 is placed between the outer screw member 132 and the first moveable sheave 110. The electric motor 126 is controlled by the control device 70, to be described later.

The electricity-driven actuator 106 moves the first moveable sheave 110 in the axial direction using the ball screw mechanism 128 by the rotation of the electric motor 126, to change an "intersheave face distance d1" which is a width between the first moveable sheave 110 and the first fixed sheave 108. More specifically, when the outer screw member 132 engaged with the small gear 130 moves to the left side in FIG. 3 while being rotated in one direction by a rotation of the electric motor 126 in one direction, the first moveable sheave 110 is also moved to the left side of FIG. 3 by the spring 114, and an intersheave face distance d1 is increased. In this case, the winding length of the belt 104 at the driving pulley 102 is reduced, and the second moveable sheave 118 is moved to the left side of FIG. 3 toward the second fixed sheave 116 by the urging force of the spring 122. Because of this, the winding position of the belt 104 with respect to the driving pulley 102 is moved toward the radially inner side, and the winding position of the belt 104 with respect to the driven pulley 98 is moved toward the radially outer side. In this case, the rotation of the driving pulley 102 is transmitted to the driven pulley 98 while reducing the rotational speed of rotation.

FIGS. 4(A) and 4(B) show winding positions of the belt 104 on the driving pulley 102 and the driven pulley 98 when a maximum reduction ratio is realized. The reduction ratio is a ratio between a rotational speed N1 of the driving pulley 102 and a rotational speed N2 of the driven pulley 98 (N1/N2), and the maximum reduction ratio is a maximum value of N1/N2.

Figure 4:
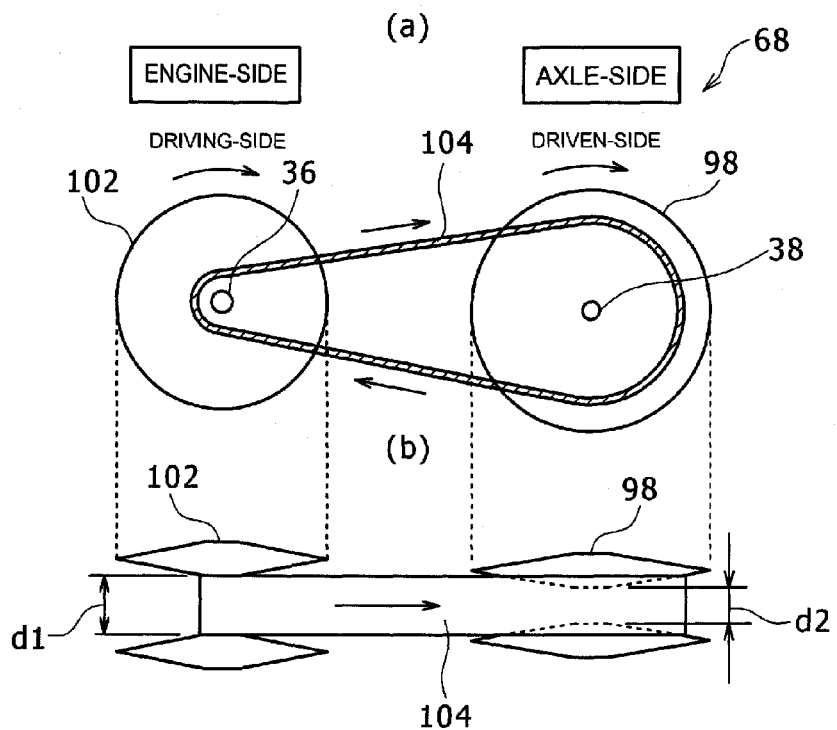
FIG. 4 is a schematic cross sectional view (A) showing a winding state of a belt between two pulleys when the maximum reduction ratio is realized in the continuously variable transmission device of FIG. 3 and a view (B) of (A) viewed from above.

In FIG. 4, the intersheave face distance d1 of the driving pulley 102 is increased, and an "intersheave face distance d2", which is a width between the second moveable sheave 118 and the second fixed sheave 116 in the driven pulley 98, is reduced. In this case, the reduction ratio N1/N2 of the continuously variable transmission device 68, which is a ratio of the rotational speed N1 of the driving pulley 102 with respect to the rotational speed N2 of the driven pulley 98, is a maximum, and the rotation of the engine 20 is transmitted to the CVT output shaft 38 while reducing the rotational speed of rotation in a maximum degree.

On the other hand, in FIG. 3, when the outer screw member 132 moves to the right side of FIG. 3 while being rotated by the rotation of the electric motor 126 in the other direction, the outer screw member 132 presses the first moveable sheave 110 toward the side of the belt 104 through the bearing 138, and the intersheave face distance d1 is reduced. In this case, the winding length of the belt 104 at the driving pulley 102 is increased, and the second moveable sheave 118 is moved to the right side of FIG. 3 away from the second fixed sheave 116, against the urging force of the spring 122. Because of this, the winding position of the belt 104 with respect to the driving pulley 102 is moved toward the radially outer side, and the winding position of the belt 104 with respect to the driven pulley 98 is moved toward the radially inner side. In this case, the rotation of the driving pulley 102 is transmitted to the driven pulley 98 while increasing the rotational speed of rotation, that is, the reduction ratio becomes less than 1.

Figure 5:
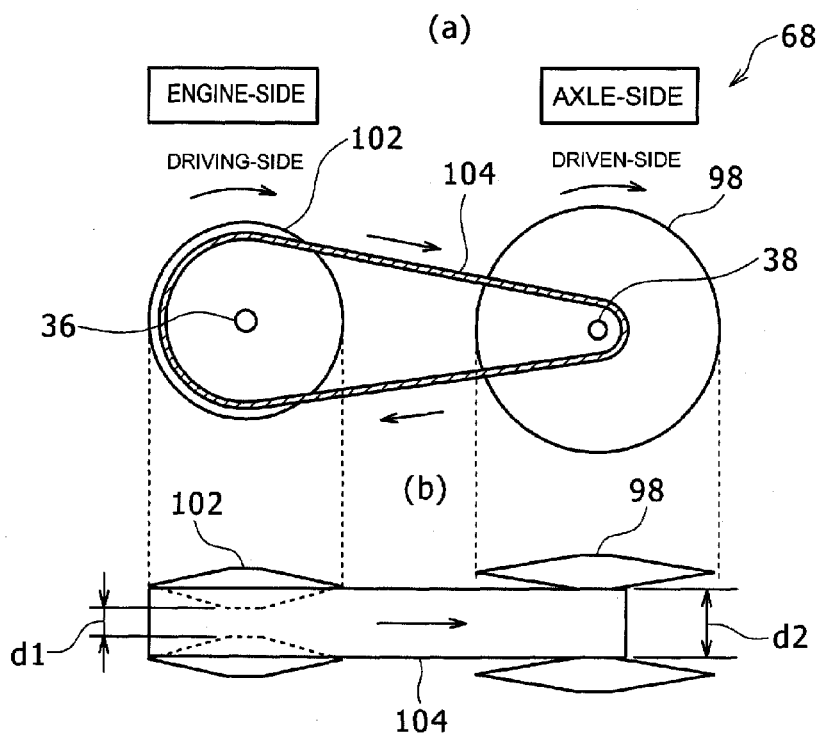
FIG. 5 is a schematic cross sectional view (A) showing a winding state of a belt between two pulleys when a minimum reduction ratio is realized in the continuously variable transmission device of FIG. 3 and a view (B) of (A) viewed from the above.

FIGS. 5(A) and 5(B) show winding positions of the belt 104 on the driving pulley 102 and the driven pulley 98 when the minimum reduction ratio is realized. In FIG. 5, the intersheave face distance d1 between the moveable sheave and the fixed sheave of the driving pulley 102 is reduced and the intersheave face distance d2 between the moveable sheave and the fixed sheave of the driven pulley 98 is increased. In this case, the reduction ratio N1/N2 of the continuously variable transmission device 68 is minimum, and the rotation of the engine 20 is transmitted to the CVT output shaft 38 while increasing the rotational speed of rotation in a maximum degree, and transmitted to the CVT output shaft 38.

Referring again to FIG. 2, the control device 70 includes a microcomputer having a CPU and a storage unit such as a memory. The control device 70 has an acceleration amount-reduction ratio relationship storage unit 141, and an actuator control unit 142.

Figure 6:
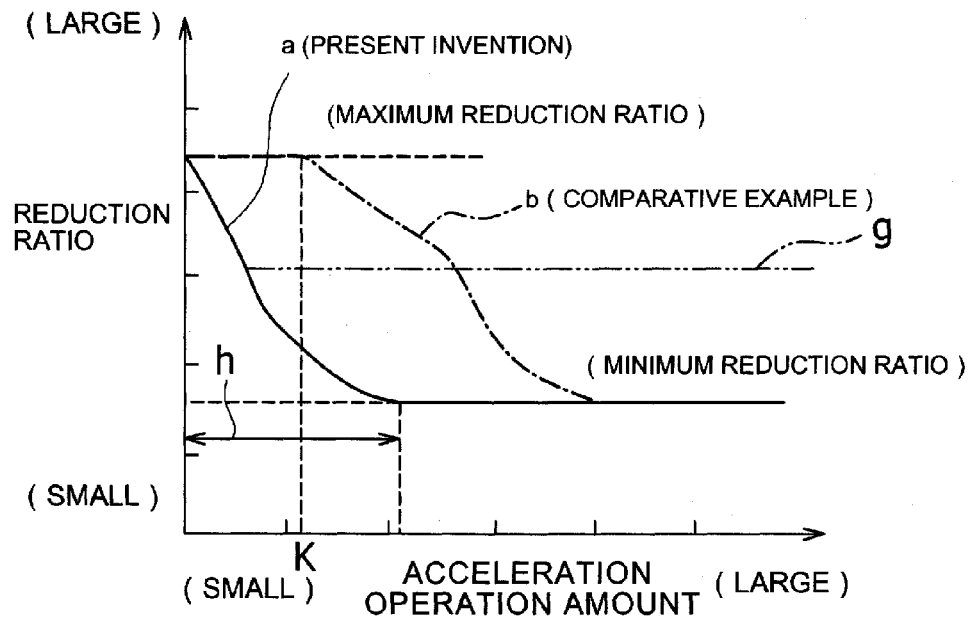
FIG. 6 is a diagram showing a relationship which is set in the system of FIG. 2, and showing a relationship between an amount of acceleration operation and a reduction ratio of the continuously variable transmission device.

The acceleration amount-reduction ratio relationship storage unit 141 stores a preset relationship between an amount of operation of acceleration and a reduction ratio of the continuously variable transmission device. FIG. 6 shows a relationship which is set in the system of FIG. 2 and which is a relationship between the acceleration operation amount and the reduction ratio of the continuously variable transmission device. As shown in FIG. 6 with a solid line a, the reduction ratio is the maximum reduction ratio when the acceleration operation amount is 0 and the reduction ratio is reduced as the acceleration operation amount is increased, even in a region of a small acceleration operation amount. When the acceleration operation amount becomes a predetermined value or larger, the reduction ratio is the minimum reduction ratio and a constant. The relationship shown by the solid line a in FIG. 6 is stored in the acceleration amount-reduction ratio relationship storage unit 141. The acceleration amount-reduction ratio relationship storage unit 141 may be a storage region of a storage unit of the control device 70.

Figure 7:
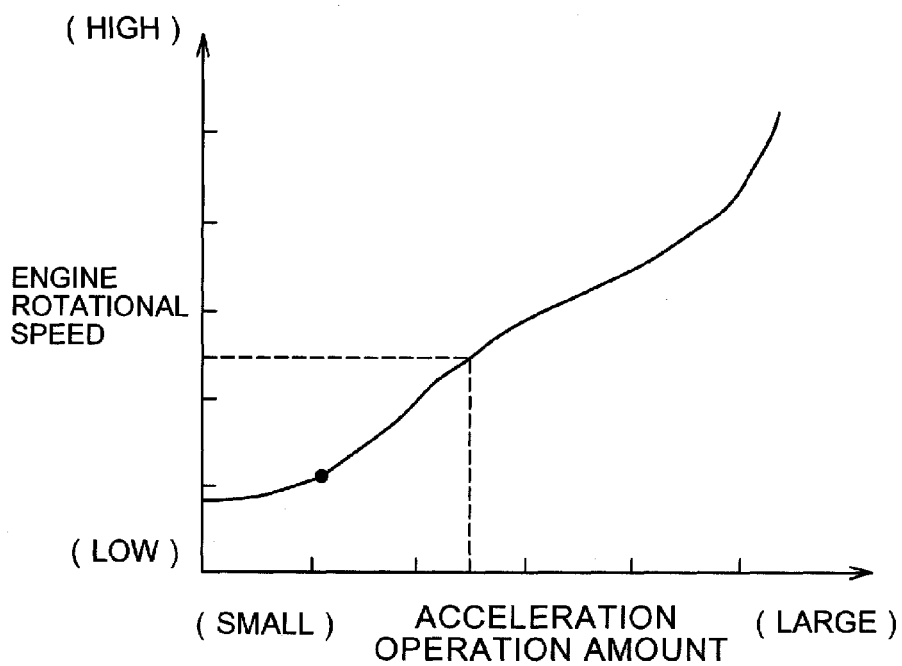
FIG. 7 is a diagram showing a relationship which is set in the system of FIG. 2, and showing a relationship between an amount of acceleration operation and an engine rotational speed.
Figure 8:
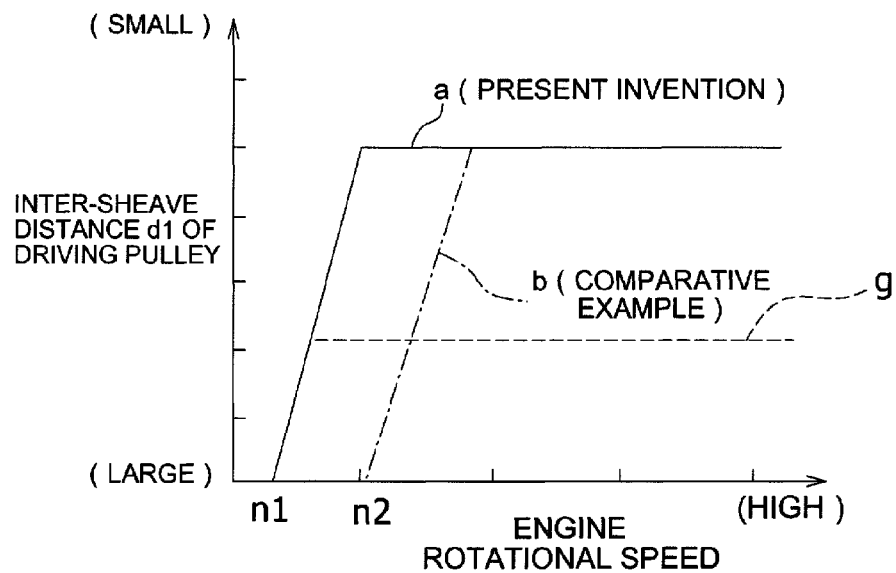
FIG. 8 is a diagram showing a relationship which is set in the system of FIG. 2, and showing a relationship between a rotational speed of an engine which is a motive power source and an intersheave face distance d1 of the driving pulley.
Figure 9:
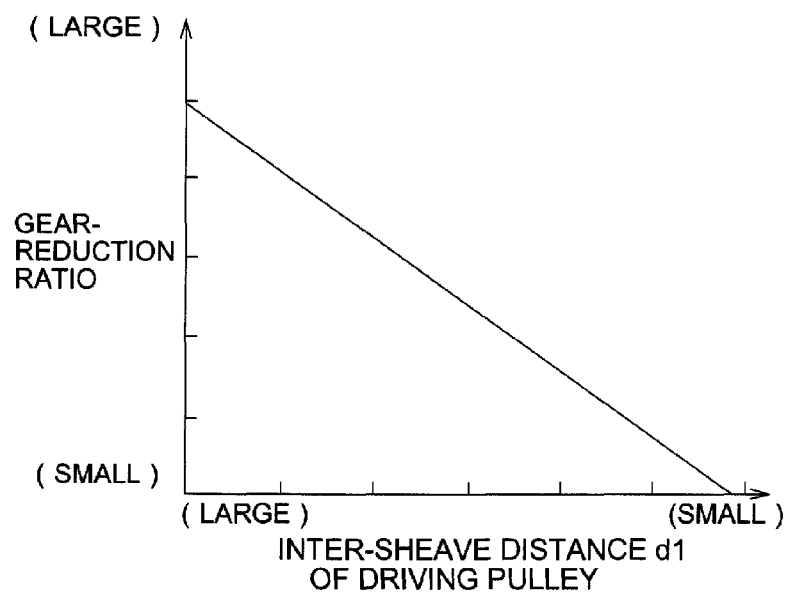
FIG. 9 is a diagram showing a relationship which is set in the system of FIG. 2, and showing a relationship between an intersheave face distance d1 of the driving pulley and the reduction ratio of the continuously variable transmission device.

A dot-and-chain line b in FIG. 6 shows a case of a Comparative Example, which will be described later. The relationship between the acceleration operation amount and the reduction ratio shown in FIG. 6 can be determined as follows. FIGS. 7-9 show relationships which are set in the system of FIG. 2. FIG. 7 shows a relationship between the acceleration operation amount and an engine rotational speed, FIG. 8 shows a relationship between the engine rotational speed and the intersheave face distance d1 of the driving pulley 102, and FIG. 9 shows a relationship between the intersheave face distance d1 and the reduction ratio of the continuously variable transmission device 68.

As shown in FIGS. 7-9, as the acceleration operation amount is increased, the rotational speed of the engine 20 is increased, and the intersheave face distance d1 is gradually reduced as the engine rotational speed is increased, until a certain predetermined value is reached. Reference numeral n1 in FIG. 8 shows a rotational speed in a case where the acceleration pedal 24 is not operated and the engine 20 rotates at an idling rotational speed. As the intersheave face distance d1 is reduced, the reduction ratio is reduced. The relationship of FIG. 6 is determined based on these relationships as shown in FIGS. 7-9.

The actuator control unit 142 applies control so that the electricity-driven actuator 106 moves the first moveable sheave 110 in the axial direction such that the reduction ratio is reduced as the acceleration operation amount is increased in a range shown by an arrow h of FIG. 6 indicating a range until the reduction ratio of the continuously variable transmission device 68 becomes the minimum reduction ratio, as a predetermined operation amount range of the acceleration operation amount according to the relationship of FIG. 6.

According to the continuously variable transmission control system 12 for a vehicle described above, even in a region of low engine rotational speed, because the control device 70 can control the electricity-driven actuator 106 to move the first moveable sheave 110 in a direction toward the first fixed sheave 108 (right side on FIG. 3), the reduction ratio of the continuously variable transmission device 68 can be set low. Therefore, the fuel consumption of the vehicle 10 equipped with the continuously variable transmission device 68 can be improved.

Figure 10:
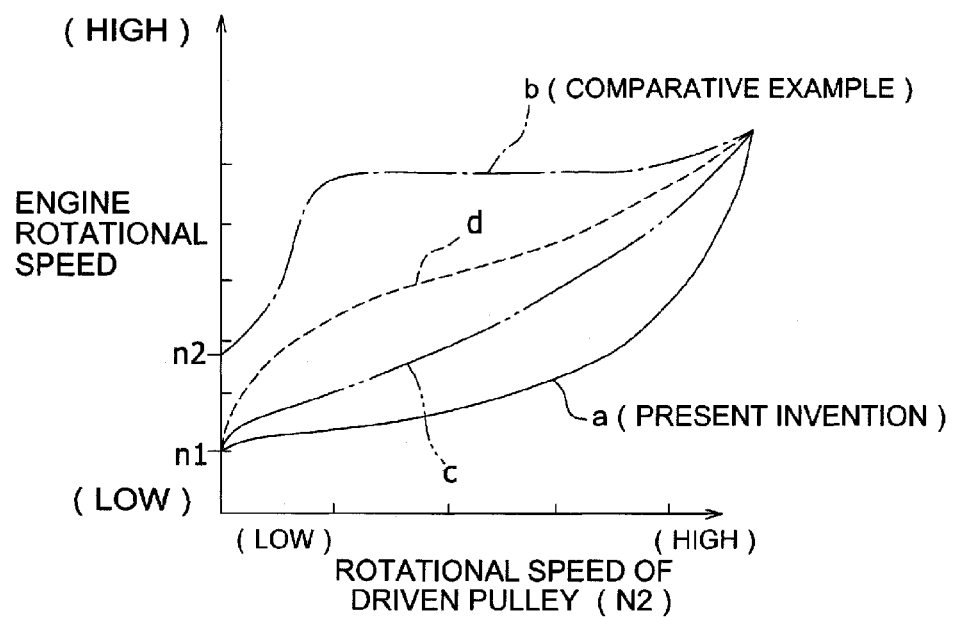
FIG. 10 is a diagram showing a relationship between a rotational speed of the driven pulley and an engine rotational speed in a preferred embodiment of the present invention, in relation to a comparative example.

FIG. 10 shows a relationship between the rotational speed of the driven pulley 98 and the engine rotational speed in the present embodiment, relative to that of the Comparative Example. As shown in FIG. 10 with a solid line a, in the present embodiment, the rotational speed of the driven pulley 98 can be set high even in a region of a low engine rotational speed. Because the rotational speed of the wheel is increased as the rotational speed of the driven pulley 98 is increased, the vehicle speed can be set high. With such a configuration, because high-speed travel may be achieved in a low-rotation region of the engine 20, the fuel consumption of the vehicle can be improved.

On the other hand, a dot-and-chain line b in FIG. 10 indicates the continuously variable transmission control system of the Comparative Example. The Comparative Example includes, similar to the structure of JP H5-203005 A described above, a cam plate which is provided around the output shaft 21 (refer to FIG. 1) of the engine 20 and which rotates synchronously with the moveable sheave, and a centrifugal weight provided between the cam plate and the moveable sheave. The cam plate and the opposing surface of the moveable sheave have cam surfaces where a distance between the cam surfaces is reduced toward a radially outer side, and the centrifugal weight is held between the cam surfaces. With such a configuration, in the Comparative Example, when the acceleration operation amount is increased and the rotational speed of the output shaft 21 is increased to a value greater than or equal to a predetermined value, the centrifugal weight is displaced to the radially outer side, the moveable sheave is moved closer to the fixed sheave, and the reduction ratio is reduced.

However, in the Comparative Example, in a region where the rotational speed of the output shaft 21 is less than a predetermined value which is relatively large, a large centrifugal force does not act on the centrifugal weight, and thus the centrifugal weight is not displaced. Because of this, as shown in FIG. 10, in the case of the Comparative Example, the engine rotational speed n2 at which the rotational speed of the driven pulley 98 starts to be increased is higher than the engine rotational speed n1 for the case of the present embodiment (present invention). In this case, as shown by a dot-and-chain line b of FIG. 8, the intersheave face distance d1 is not reduced until the engine rotational speed becomes high, and, as shown by a dot-and-chain line b of FIG. 6, the reduction ratio of the continuously variable transmission device 68 is not reduced from the maximum reduction ratio until the acceleration operation amount becomes greater than or equal to a predetermined value K. In this regard, the fuel consumption performance of the Comparative Example is inferior compared to that of the present embodiment.

Figure 11:
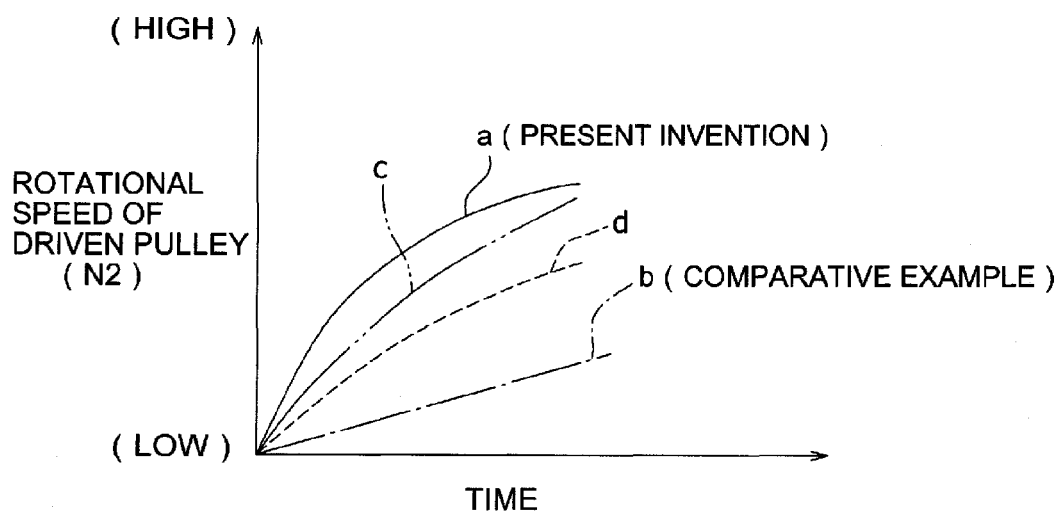
FIG. 11 is a diagram showing a change with respect to time of the rotational speed of the driven pulley at the startup of the vehicle in a preferred embodiment of the present invention.

FIG. 11 shows a change, with respect to time, of the rotational speed of the driven pulley 98 upon startup of the vehicle in the present embodiment. In FIG. 11, a rate of increase of the acceleration operation amount at the startup is set constant. While, in the present embodiment shown by a solid line a of FIG. 11, the rotational speed of the driven pulley 98 is rapidly increased at an initial stage of the startup, in the Comparative Example shown by a dot-and-chain line b of FIG. 11, the increase in the rotational speed of the driven pulley 98 is gradual even when the vehicle is started up, and thus, the fuel consumption improvement effect is inferior compared to the present embodiment.

In addition, as shown by a two-dots-and-chain line c and a broken line d of FIGS. 10 and 11, the degree to which the reduction ratio is reduced as the acceleration operation amount is increased may be changed by control of the actuator control unit 142, compared to the solid line a showing the present embodiment. With such configurations, in the cases shown by the two-dot-and-chain line c and the broken line d, the relationship between the rotational speed of the driven pulley 98 and the engine rotational speed and the increase of the rotational speed of the driven pulley 98 at startup would change from the case shown by the solid line a. The torque of the engine 20 changes according to the rotational speed of the engine. Because of this, depending on the characteristic of the engine 20, it may be more advantageous to increase the engine rotational speed more rapidly as the rotational speed of the driven pulley 98 is increased, and consequently, there may be cases where the use of the characteristic shown by the two-dots-and-chain line c and the broken line d is more preferable. The characteristic shown by the two-dots-and-chain line c and the broken line d may be easily realized by changing the relationship between the acceleration operation amount and the reduction ratio stored in the acceleration amount-reduction ratio relationship storage unit 141 of the control device 70, and thus, the setting of the acceleration characteristic of the vehicle 10 can be easily changed, and the degree of freedom of setting the acceleration characteristic can be increased. Alternatively, a plurality of curves showing the relationships between the acceleration operation amount and the reduction ratio may be stored in the acceleration amount-reduction ratio relationship storage unit 141, and the relationship between the acceleration operation amount and the reduction ratio used in execution in the continuously variable transmission device 68 may be switched according to satisfaction or non-satisfaction of preset conditions.

Figure 12:
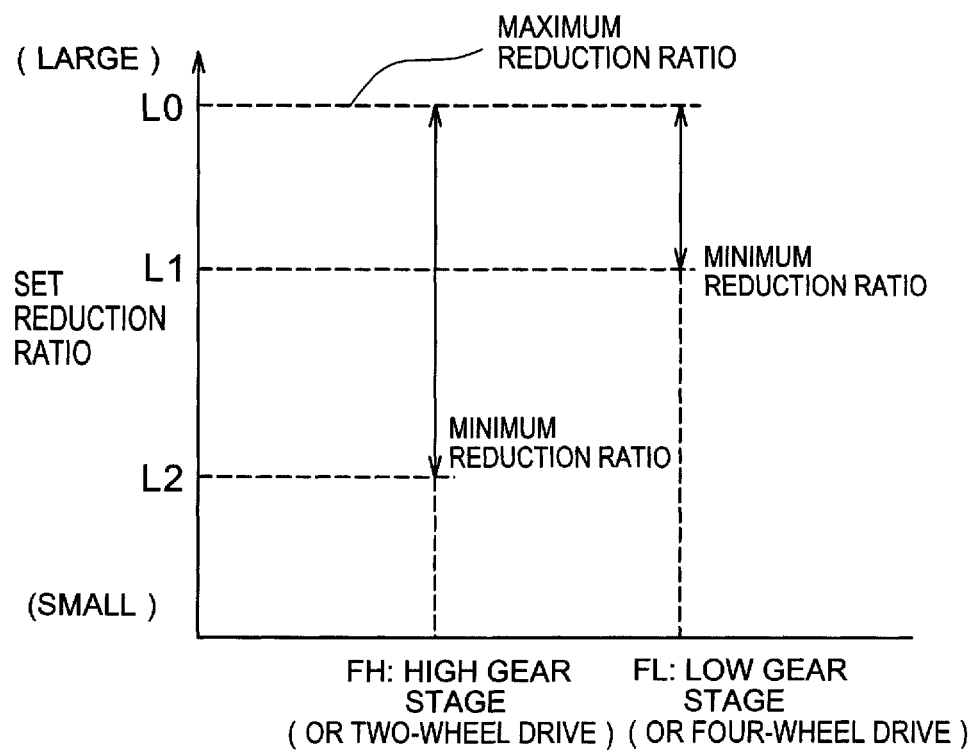
FIG. 12 is a diagram showing a relationship between an operation position of a speed change lever (or a traveling state of two-wheel drive and four-wheel drive) and a reduction ratio which is set (set reduction ratio) in continuously variable transmission control systems of first and second configurations which are alternative configurations of a preferred embodiment of the present invention.

FIG. 12 shows a relationship between an operation position of the speed change lever 30 and a reduction ratio which is set (set reduction ratio) in the continuously variable transmission control system 12 according to a first alternative configuration of the preferred embodiment of the present invention. FIG. 12 also shows a relationship between a traveling state of the two-wheel drive and the four-wheel drive and the set reduction ratio in a second alternative configuration of the present embodiment, which will be described later.

In the first alternative configuration, with reference to FIG. 2, the control device 70 comprises a minimum reduction ratio changing unit 144. The minimum reduction ratio changing unit 144 controls the electricity-driven actuator 106 to change the minimum reduction ratio according to detection signals of the speed change lever switches HS and LS on the forward-traveling side. More specifically, the minimum reduction ratio changing unit 144 regulates a movement range of the first moveable sheave 110 so that the minimum reduction ratio of the continuously variable transmission device 68 is set at a predetermined reduction ratio which is set according to an operation position of the speed change lever 30 indicated by the detection signals of the speed change lever switches HS and LS.

For example, when the speed change lever 30 is operated to the position of FL (FIG. 2), a forward traveling, low gear stage is commanded. Therefore, the reduction ratio changes from the maximum reduction ratio L0 at startup to the minimum reduction ratio L1 according to the increase of the operation amount of the acceleration pedal 24. In a state where the minimum reduction ratio L1 is realized, the intersheave face distance d1 of the driving pulley 102 is set between the width d1 for realizing the maximum reduction ratio of FIG. 4 as described above and the width d1 for realizing the minimum reduction ratio of FIG. 5. In this case, the intersheave face distance d2 of the driven pulley 98 is also set between the width d2 of FIG. 4 and the width d2 of FIG. 5.

On the other hand, when the speed change lever 30 is operated to a position of FH (FIG. 2), a forward traveling, high gear stage is commanded. Therefore, the reduction ratio changes from the maximum reduction ratio L0 at startup to the minimum reduction ratio L2 which is smaller than L1 according to the increase of the operation amount of the acceleration pedal 24. The minimum reduction ratio L2 is identical to the width d1 for realizing the minimum reduction ratio of FIG. 5.

According to the above-described configuration, with the operation of the speed change lever 30, not only is the transmission stage of the transmission gear device 48 (FIG. 1) changed, but traveling in which a high torque is generated at the wheel according to the operation of the user can also be enabled. For example, when the speed change lever 30 is operated to a position of FL which is the low gear stage, the reduction ratio L1 of the continuously variable transmission device 68 is maintained higher than the minimum reduction ratio L2 in the case where the speed change lever 30 is operated to the position of FH, in a range where the acceleration operation amount is greater than or equal to a certain magnitude. In this case, with reference to FIG. 8, for example, the relationship between the engine rotational speed and the intersheave face distance d1 is set at a position shown by the broken line g of FIG. 8, for example, and the relationship between the acceleration operation amount and the reduction ratio is set at a position shown by the two-dots-and-chain line g of FIG. 6. Because of this, the continuously variable transmission device 68 can be maintained at a high reduction ratio L1 in a region of the engine rotational speed from middle to high rotational speeds, and a high torque can be generated at the wheel. When the speed change lever 30 is operated to the position of FH, the relationship between the acceleration operation amount and the reduction ratio is similar to the solid line a of FIG. 6. The other structures and operations are similar to those of the embodiment described with reference to FIGS. 1-11.

In the first alternative configuration described above, the gear of the forward traveling, transmission stage of the transmission gear device 48 (FIG. 1) may be changed from two stages to one stage. In this case also, when the speed change lever 30 is operated to the FL position, a traveling in which a higher torque is generated compared to the case where the speed change lever 30 is operated to the FH position can be enabled. In addition, in this case, because the number of gears of the transmission gear device 48 can be reduced, the cost can be reduced.

Moreover, in a structure in which the operation position can be switched among three or more positions for commanding the forward traveling in the speed change lever 30, the control device 70 may be configured such that the minimum reduction ratio is changed according to the detected operation position. In this case, a degree of freedom of selection of the traveling characteristic can be improved.

Next, a second alternative configuration of the present embodiment will be described with reference to FIG. 12, similar to the first alternative configuration. In the present configuration, the minimum reduction ratio changing unit 144 of the control device 70 sets a four-wheel drive predetermined reduction ratio L1 or a two-wheel drive predetermined reduction ratio L2 according to acquisition of a switching command signal of the drive switching switch 81 (FIG. 2), and regulates the movement range of the first moveable sheave 110 so that the minimum reduction ratio of the continuously variable transmission device 68 is set to the set predetermined reduction ratio L1 (or L2).

For example, when the travel is switched from the two-wheel drive travel to the four-wheel drive travel by the drive switching switch 81, the reduction ratio changes from the maximum reduction ratio L0 at startup to the four-wheel drive predetermined reduction ratio L1 which is the minimum reduction ratio, according to the increase of the operation amount of the acceleration pedal 24.

On the other hand, when the traveling is switched from the four-wheel drive travel to the two-wheel drive travel by the drive switching switch 81, the reduction ratio changes from the maximum reduction ratio L0 at startup to the two-wheel drive predetermined reduction ratio L2 which is the minimum reduction ratio smaller than L1, according to the increase of the operation amount of the acceleration pedal 24.

According to the above-described configuration, when the four-wheel drive travel is commanded by the operation of the drive switching switch 81, similar to the case where the speed change lever 30 is operated to the FL position in the first alternative configuration described above, traveling in which a high torque is generated at the wheel is enabled, and the four-wheel drive travel can be stably realized. The case where the two-wheel drive travel is commanded by the operation of the drive switching switch 81 is similar to the case where the speed change lever 30 is operated to the FH position in the first alternative configuration. With such a configuration, a preferable transmission characteristic corresponding to the switching of the two-wheel drive and four-wheel drive can be realized. The other structures and operations are similar to those of the structure of FIGS. 1-11.

In the above-described configurations, cases are described in which the two-wheel drive travel and the four-wheel drive travel are switched by a manual operation of the drive switching switch 81, but alternatively, a configuration may be employed in which the control device 70 automatically switches between the two-wheel drive travel and the four-wheel drive travel according to a speed difference between the front wheel 14 and the rear wheel 16 or the vehicle speed. For example, a front-side rotation sensor and a rear-side rotation sensor that detect the rotational speeds of the front wheels 14 and the rear wheels 16, respectively, may be provided on the vehicle 10, and the detection signals of the front-side rotation sensor and the rear-side rotation sensor may be transmitted to the control device 70. The control device 70 calculates a vehicle speed based on an average of the detection values of the rotation speeds of the front-side rotation sensor and the rear-side rotation sensor, and controls the drive switching actuator of the shaft connection switching mechanism T (FIG. 1) when the vehicle speed is greater than or equal to a predetermined speed which is set in advance, to realize the four-wheel drive travel. Similarly, the control device 70 controls the drive switching actuator when the vehicle speed is less than the predetermined speed, to realize the two-wheel drive travel.

Alternatively, a configuration may be employed in which the control device 70 judges that, when a difference between the detection values of the rotational speeds of the front-side rotation sensor and the rear-side rotation sensor is greater than or equal to a predetermined value which is set in advance, slip is caused in one of the front wheels 14 and the rear wheels 16 and realize the four-wheel drive travel by controlling the drive switching actuator, and when the difference between the detection values of the front-side rotation sensor and the rear-side rotation sensor is less than the predetermined value, the control device 70 realizes the two-wheel drive travel by controlling the drive switching actuator.

According to the above-described structure, travel stability can be improved. In addition, wasteful energy consumption due to slipping of the front wheel 14 or the rear wheel 16 can be inhibited. In this case, the control device 70 generates a "switch command signal" indicating a command of switching between the two-wheel drive travel and the four-wheel drive travel. For this purpose, in the second alternative configuration described above, a structure may be employed in which the four-wheel drive predetermined reduction ratio L1 or the two-wheel drive predetermined reduction ratio L2 is set according to the acquisition of the "switch command signal" and the movement range of the first moveable sheave 110 is regulated so that the minimum reduction ratio of the continuously variable transmission device 68 is set to the set predetermined reduction ratio L1 (or L2).

Figure 13:
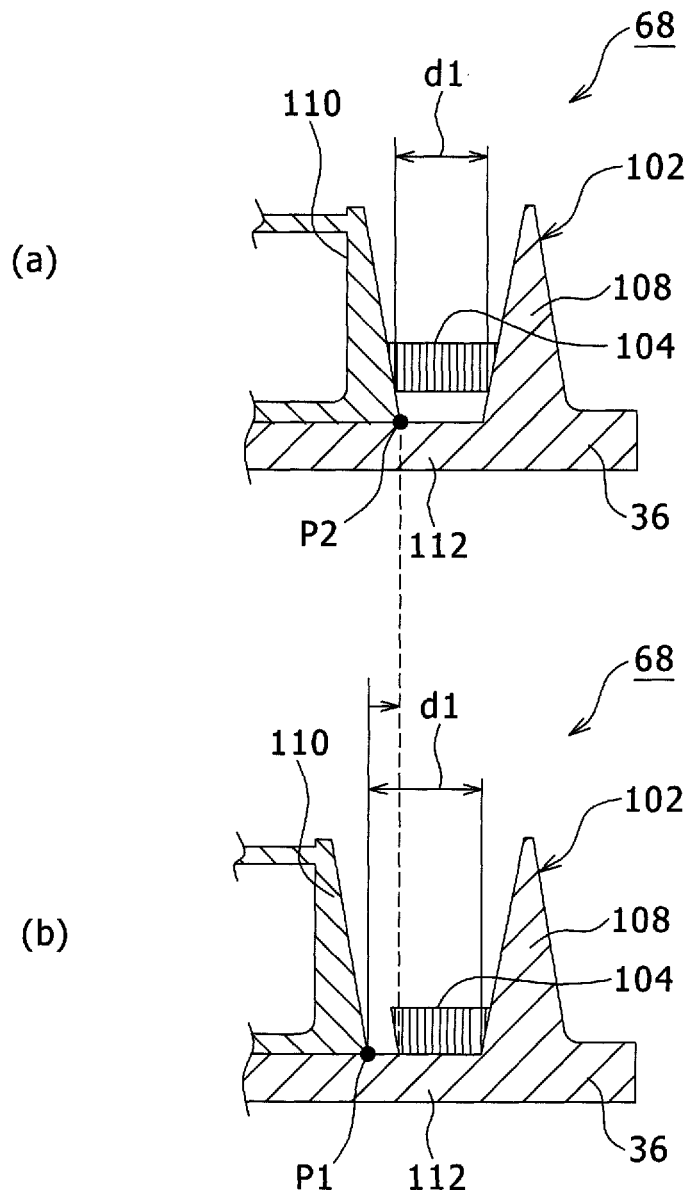
FIG. 13 is a diagram (A) corresponding to an A-part of FIG. 3 in a continuously variable transmission device in a third configuration which is an alternative configuration of a preferred embodiment of the present invention, and a diagram (B) showing a belt-released state in (A) in which pinching of the belt in the driving pulley is released.

FIG. 13 is a diagram (A) corresponding to an A part of FIG. 3 in a continuously variable transmission device 68 in a third alternative configuration of the preferred embodiment of the present invention, and a diagram (B) showing a belt release state in which, in (A), the pinching of the belt 104 is released at the driving pulley 102.

In the present configuration, upon satisfaction of a preset "predetermined release condition", for example, when the brake pedal switch 78 or the parking lever switch 80 is switched ON while the key switch 74 is in the ON state, the control device 70 causes the first moveable sheave 110 to displace greatly away from the first fixed sheave 108 so that the pinching of the belt 104 is released between the first moveable sheave 110 and the first fixed sheave 108 at the driving pulley 102. More specifically, upon satisfaction of the "predetermined release condition", the actuator control unit 142 (refer to FIG. 2) of the control device 70 displaces the first moveable sheave 110 further away from the first fixed sheave 108 from a state where the maximum reduction ratio is realized in the driving pulley 102 as shown in FIG. 13(A), to move the first moveable sheave 110 to the belt release position of FIG. 13(B). In this case, a position of one end (right end of FIG. 13(B)) of the first moveable sheave 110 closest to the first fixed sheave 108 is a belt release position P1.

In this state, the other end (Q of FIG. 3) of the first moveable sheave 110 is caused to hit a part of the CVT input shaft 36 or a member fixed on the CVT input shaft 36. In this state, the pinching of the belt 104 between the first moveable sheave 110 and the first fixed sheave 108 is released, and an inner circumferential surface of the belt 104 contacts an outer circumferential surface of the shaft portion 112 of the CVT input shaft 36 or an outer circumferential surface of a slide bearing (not shown) which is fitted to the shaft portion 112. In this state, a size of the belt 104 and a size of a portion where the belt 104 is bridged are regulated such that a tension applied from the CVT input shaft 36 and the driven pulley 98 to the belt 104 is 0. In this state, the rotation of the CVT input shaft 36 is not transmitted to the belt 104, and the CVT input shaft 36 runs idle with respect to the belt 104. In the driven pulley 98 of FIG. 3, the second moveable sheave 118 is moved toward the second fixed sheave 116 which is a movement restricting unit by an urging force of the spring 122 until one end (R of FIG. 3) of the second moveable sheave 118 hits the step surface 124 of the CVT output shaft 38.

According to the above-described configuration, for example, in the case of brake-ON, in which the brake pedal switch 78 or the parking lever switch 80 is in the ON state, the pinching of the belt 104 between the first moveable sheave 110 and the first fixed sheave 108 is released, and the motive power of the CVT input shaft 36 is not transmitted to the belt 104. Because of this, when the vehicle 10 is decelerated at brake-ON, wearing of the belt 104 can be inhibited in a case where a deviation is created between the rotational speed of the CVT input shaft 36 when the rotational speed of the engine 20 is reduced and the speed of the belt in the rotational direction of the CVT input shaft 36 when the rotational speed of the CVT output shaft 38 on the side of wheels is reduced.

Further, the actuator control unit 142 controls the electricity-driven actuator 106 so that the pinching of the belt 104 between the first moveable sheave 110 and the first fixed sheave 108 is released when a "predetermined stop condition", which is set in advance, is satisfied. In addition, the actuator control unit 142 controls the electricity-driven actuator 106 so that the belt 104 is pinched between the first moveable sheave 110 and the first fixed sheave 108 when a "predetermined startup condition", which is set in advance and which includes a condition that the acceleration pedal 24 is operated, is satisfied.

Figure 14:
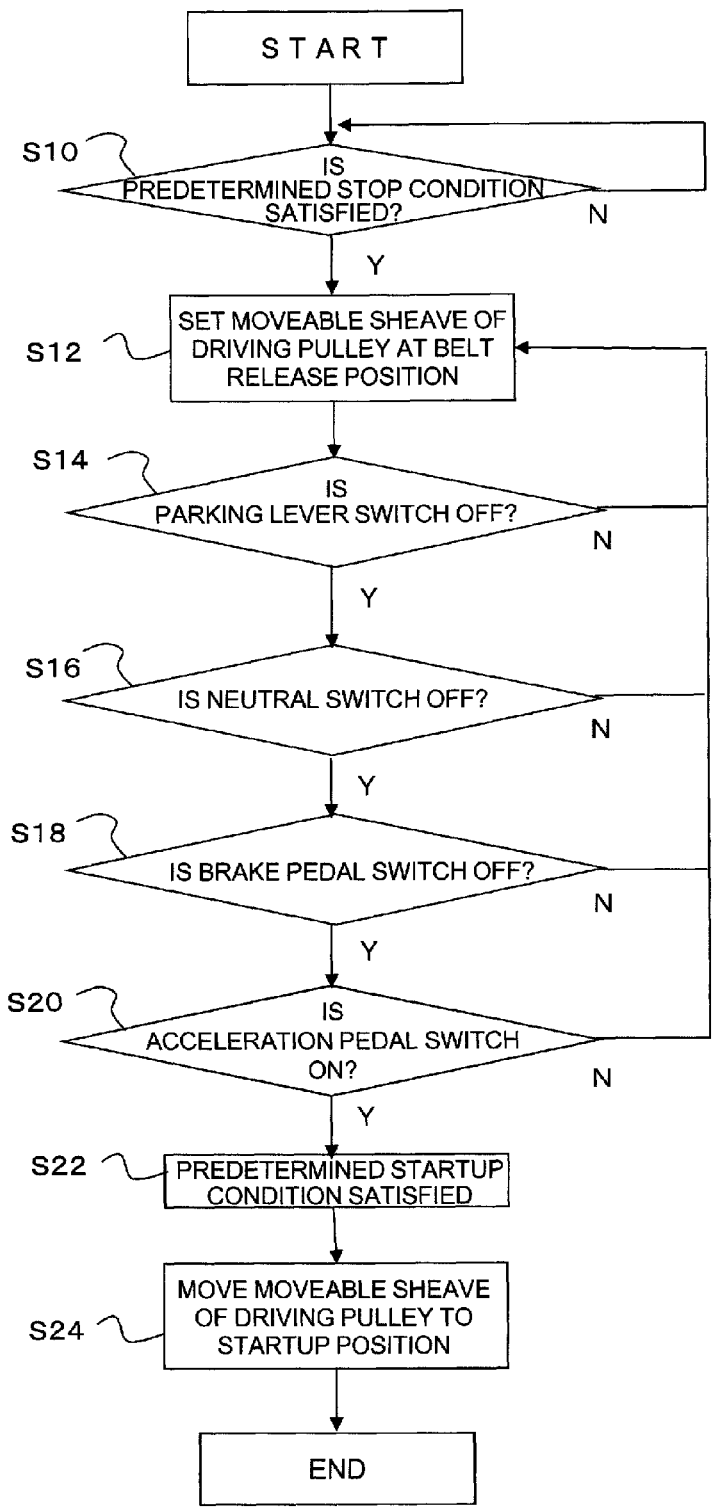
FIG. 14 is a diagram showing a flowchart used in execution of a control method to move the moveable sheave of the driving pulley when a predetermined startup condition is satisfied in a continuously variable transmission control system which uses the continuously variable transmission device of FIG. 13.

These controls will now be described with reference to FIG. 14. FIG. 14 shows a flowchart used in execution of a control method of moving the first moveable sheave 110 of the driving pulley 102 when the predetermined startup condition is satisfied in the continuously variable transmission control system 12 which uses the continuously variable transmission device 68 shown in FIG. 13. A program that executes the flowchart shown in FIG. 14 is stored in the storage unit of the control device 70, and is executed by the actuator control unit 142.

In step S10, the actuator control unit 142 judges whether or not the "predetermined stop condition" is satisfied, and when the predetermined stop condition is satisfied, the process proceeds to step S12. In the following description, the step will be simply referred to as "S". The "predetermined stop condition" is satisfied, for example, within a predetermined period from switching of the key switch 74 from OFF to ON, and is not satisfied in other cases. Alternatively, the "predetermined stop condition" may be satisfied when the key switch 74 is switched ON and a vehicle speed of 0 is detected by a vehicle speed sensor (not shown). In place of providing the vehicle speed sensor, the control device 70 may alternatively judge that the vehicle speed of 0 is detected when the control device 70 acquires that the rotational speed is 0 from the detection signal of the CVT output shaft rotation sensor 94.

In S12, the electricity-driven actuator 106 is controlled such that the first moveable sheave 110 of the driving pulley 102 is set at the belt release position P1 shown in FIG. 13(B). In this case, the belt 104 is released between the first fixed sheave 108 and the first moveable sheave 110. Then, from S14 to S20 of FIG. 14, it is judged whether or not a predetermined startup condition is satisfied. The "predetermined startup condition" is satisfied when, in a state where the first moveable sheave 110 is set at the belt release position P1 due to the satisfaction of the "predetermined stop condition", the parking lever switch 80 is switched OFF, the neutral switch 92 is switched OFF, the brake pedal switch 78 is switched OFF, and the acceleration pedal switch 75 is switched ON, and the "predetermined startup condition" is not satisfied in other cases.

More specifically, in S14, it is judged whether or not the parking lever switch 80 is switched OFF, in S16, it is judged whether or not the neutral switch 92 is switched OFF, in S18, it is judged whether or not the brake pedal switch 78 is switched OFF, and in S20, it is judged whether or not the acceleration pedal switch 75 is switched ON. When all of the judgment results of S14, S16, S18, and S20 are positive, the predetermined startup condition is judged to be satisfied in S22, and if any of the judgment results of S14, S16, S18, and S20 is negative, the process returns to S12 and is repeated. In S24, in response to the judgment of the actuator control unit 142 that the predetermined startup condition is satisfied, the actuator control unit 142 controls the electricity-driven actuator 106 such that the first moveable sheave 110 is moved from the belt release position P1 to a startup position P2 shown in FIG. 13(A). In this case, the belt 104 is pinched between the first fixed sheave 108 and the first moveable sheave 110.

According to the above-described configuration, in S12 in the case where the predetermined stop condition is satisfied, even when the engine 20 is activated by the switching ON of the key switch 74, the motive power of the engine 20 is not transmitted from the driving pulley 102 to the driven pulley 98, and thus, the vehicle 10 does not start to move. When the predetermined startup condition is satisfied, the first moveable sheave 110 moves to the startup position P2, the motive power is transmitted between the driving pulley 102 and the driven pulley 98 through the belt 104, and the vehicle 10 can be started to move. In this case, the startup position P2 of the first moveable sheave 110 can be easily adjusted to an arbitrary position by control of the electricity-driven actuator 106. For example, when it is judged that the speed change lever 30 is operated to the position of FL corresponding to forward travel and low gear stage, by the detection signal of the speed change lever switch LS, the actuator control unit 142 changes the startup position P2 to a position more to the left side than in the case of FIG. 13(A), compared to the case where the speed change lever 30 is operated to the FH position corresponding to forward travel and high gear stage. In this case, the maximum reduction ratio at startup at the FL position is greater than the maximum reduction ratio at the startup at the FH position, and startup of the vehicle 10 with a high torque can be enabled. Alternatively, a mode switching switch (not shown) may be provided in the continuously variable transmission control system 12, and the startup position P2 may be changed according to a switching position which is selected by the mode switching switch.

In S20, in place of judging whether or not the acceleration pedal switch 75 is switched ON, it is also possible to judge whether or not the acceleration operation amount is greater than or equal to a predetermined value using the detection value of the acceleration pedal sensor 76. In this case, the acceleration pedal 24 is judged as being operated when the acceleration operation amount is greater than or equal to the predetermined value. The other structures and operations are similar to those of any of the structures described above.

Figure 15:
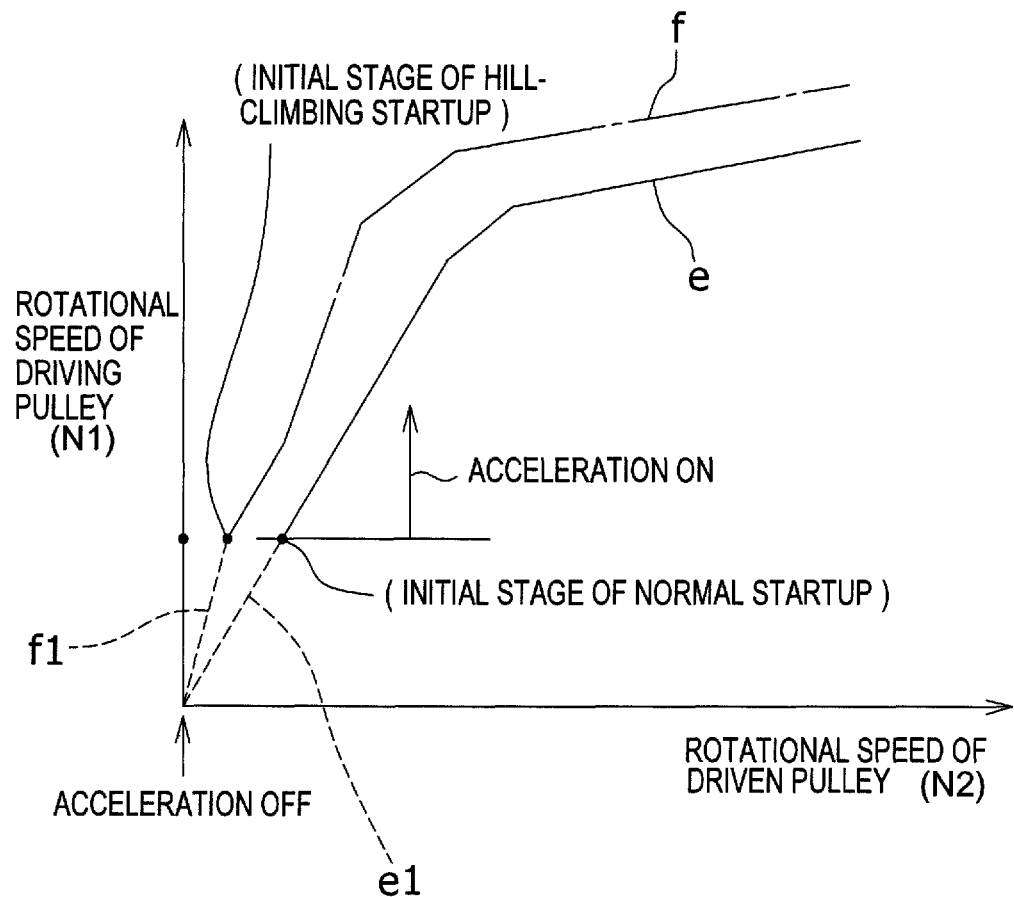
FIG. 15 is a diagram showing, using a relationship between rotational speeds of the driving pulley and the driven pulley, switching of the reduction ratio at an initial stage of startup of the vehicle in a continuously variable transmission control system of a fourth configuration which is an alternative configuration of a preferred embodiment of the present invention.

FIG. 15 is a diagram showing switching of the reduction ratio at the initial stage of startup of the vehicle using the relationship between the rotational speeds of the driven pulley and the driving pulley 102 in a continuously variable transmission control system 12 of a fourth alternative configuration of the preferred embodiment of the present invention. In the present configuration, with reference to FIG. 2, the continuously variable transmission control system 12 comprises an inclination sensor 146 which is an inclination detection unit. The inclination sensor 146 detects an inclination angle of the road surface on which the vehicle 10 is positioned, and detects whether or not the vehicle 10 is in a hill-climbing state of a hill road having an inclination angle of a predetermined angle or greater. The detection signal of the inclination sensor 146 is transmitted to the control device 70.

When the judgement that the vehicle 10 is in a hill-climbing state based on the detection signal of the inclination sensor 146 in the case where the predetermined startup condition described above with reference to FIG. 14 is satisfied, the actuator control unit 142 controls the electricity-driven actuator 106 so that the reduction ratio of the continuously variable transmission device 68 at the initial stage of startup is greater compared to that in the case of the initial stage of a normal startup, which is startup other than the hill-climbing state. For example, when it is judged in FIG. 15 that the state is an initial stage of normal startup, the relationship between the rotational speeds of the driven pulley 98 and the driving pulley 102 is set as shown by a solid line e. On the other hand, when it is judged that the state is an initial stage of the hill-climbing startup, the relationship between the rotational speeds of the driven pulley 98 and the driving pulley 102 is set as shown by a dot-and-chain line f. In this case, the reduction ratio at the initial stage of the normal startup is represented by a slope of a broken line e1, and the reduction ratio of the initial stage of the hill-climbing startup is represented by a slope of a broken line f1, and thus the reduction ratio at the initial stage of the hill-climbing startup is greater.

Alternatively, as the inclination detection unit, a structure may be employed having an inclination sensor, that detects an inclination angle of a road on which the vehicle 10 is positioned, and an inclination judging unit (not shown) provided in the control device 70. In this case, the inclination judging unit judges whether or not the detection value of the inclination angle acquired from the inclination sensor is greater than or equal to a predetermined value in a state where a front part of the vehicle is at a higher elevation than the rear part, and, when the detection value is greater than or equal to the predetermined value, the inclination judging unit detects that the vehicle 10 is in the hill-climbing state of the hill road.

According to the above-described configuration, because the reduction ratio at the initial stage of the hill-climbing startup can be set higher than the reduction ratio at the initial stage of the normal startup, the hill-climbing startup can be realized with a high torque, and the hill-climbing performance can be improved. The other structures and operations are similar to those of the structure described above with reference to FIGS. 13 and 14.

As an alternative configuration, with reference to FIG. 2, the continuously variable transmission control system 12 may include a weight sensor 147. The weight sensor 147 detects an amount of increase of the weight on the vehicle 10 from the state where no passenger is on board the vehicle 10, and transmits a detection signal indicating the amount of increase to the control device 70. The control device 70 judges at the initial stage of startup of the vehicle whether or not the amount of increase is greater than or equal to a predetermined amount which is set in advance, and when the control device 70 judges that the amount of increase is greater than or equal to the predetermined amount, the control device 70 increases the reduction ratio compared to the case of the initial stage of the normal startup, similar to the case where it is judged that the startup is a hill-climbing startup in FIG. 15. According to such a configuration, a high-torque startup can be realized when the weight of objects equipped on the vehicle 10 is large, and the startup performance can be improved.

FIGS. 16-21 show first through sixth configurations of a drive circuit of the electric motor 126 (FIG. 3) which forms the electricity-driven actuator 106 in the continuously variable transmission control system 12 of the present embodiment. The structures of the first through sixth configurations can be applied to any of the above-described configurations of FIGS. 1-15.

First, a drive circuit of the first configuration shown in FIG. 16 will be described. One connection terminal of two connection terminals of each of the parking lever switch 80, the neutral switch 92, the brake pedal switch 78, and the acceleration pedal switch 75 is connected to the control device 70. A cathode of the battery 66 is connected through the key switch 74 to the other connection terminal of the two connection terminals of each of the parking lever switch 80, the neutral switch 92, the brake pedal switch 78, and the acceleration pedal switch 75. One connection terminal of the key switch 74 is connected to a connection point A1 between a ground terminal GND of the control device 70 and an anode of the battery 66 through a coil 150 which forms a power feed relay 148. The other connection terminal of the key switch 74 is connected to the control device 70 through a switch body 151 which form the power feed relay 148 and a fuse 152. The fuse 152 prevents an excessive current from flowing to the control device 70.

In addition, detection signals are transmitted to the control device 70 from the sheave position sensor 96, the acceleration pedal sensor 76, the CVT input shaft rotation sensor 90, and the CVT output shaft rotation sensor 94. The electric motor 126 is connected to the control device 70.

In this case, when the key switch 74 is switched ON, the switch body 151 of the power feed relay 148 is switched ON. Thus, power is fed from the battery 66 to the control device 70, and the control device 70 is activated. When the key switch 74 is switched OFF, the switch body 151 is switched OFF, the power feed from the battery 66 to the control device 70 is disconnected, and the activation of the control device 70 is stopped. The control device 70 has a function of the motor controller. When the control device 70 controls driving of the electric motor 126 by the actuator control unit 142, the control device 70 causes a driving direct current to be supplied to the electric motor 126 to rotate the electric motor 126 in one direction or in the other direction.

Figure 16:
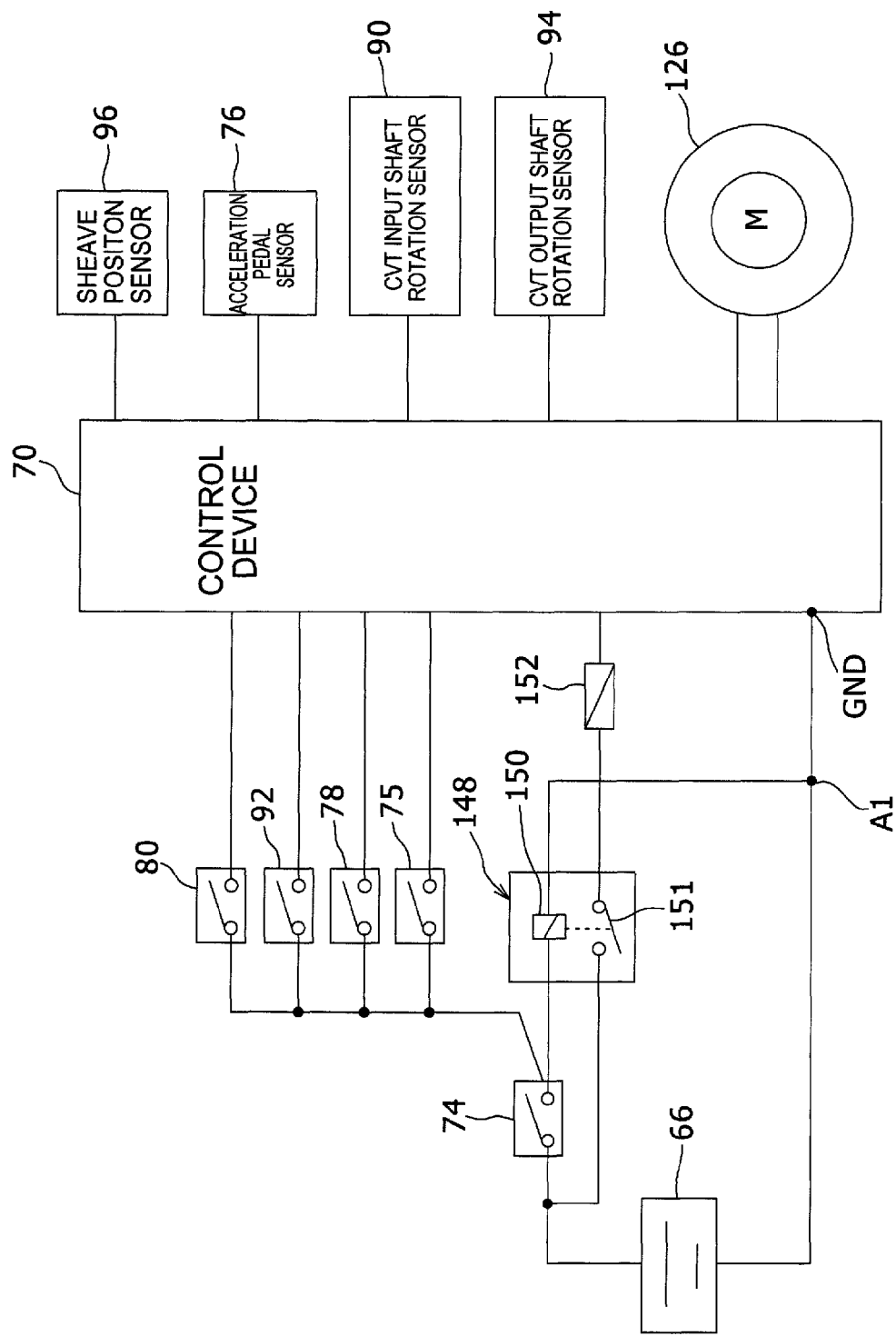
FIG. 16 is a diagram showing a first example configuration of a drive circuit of an electric motor forming an electricity-driven actuator in a continuously variable transmission control system according to a preferred embodiment of the present invention.
Figure 17:
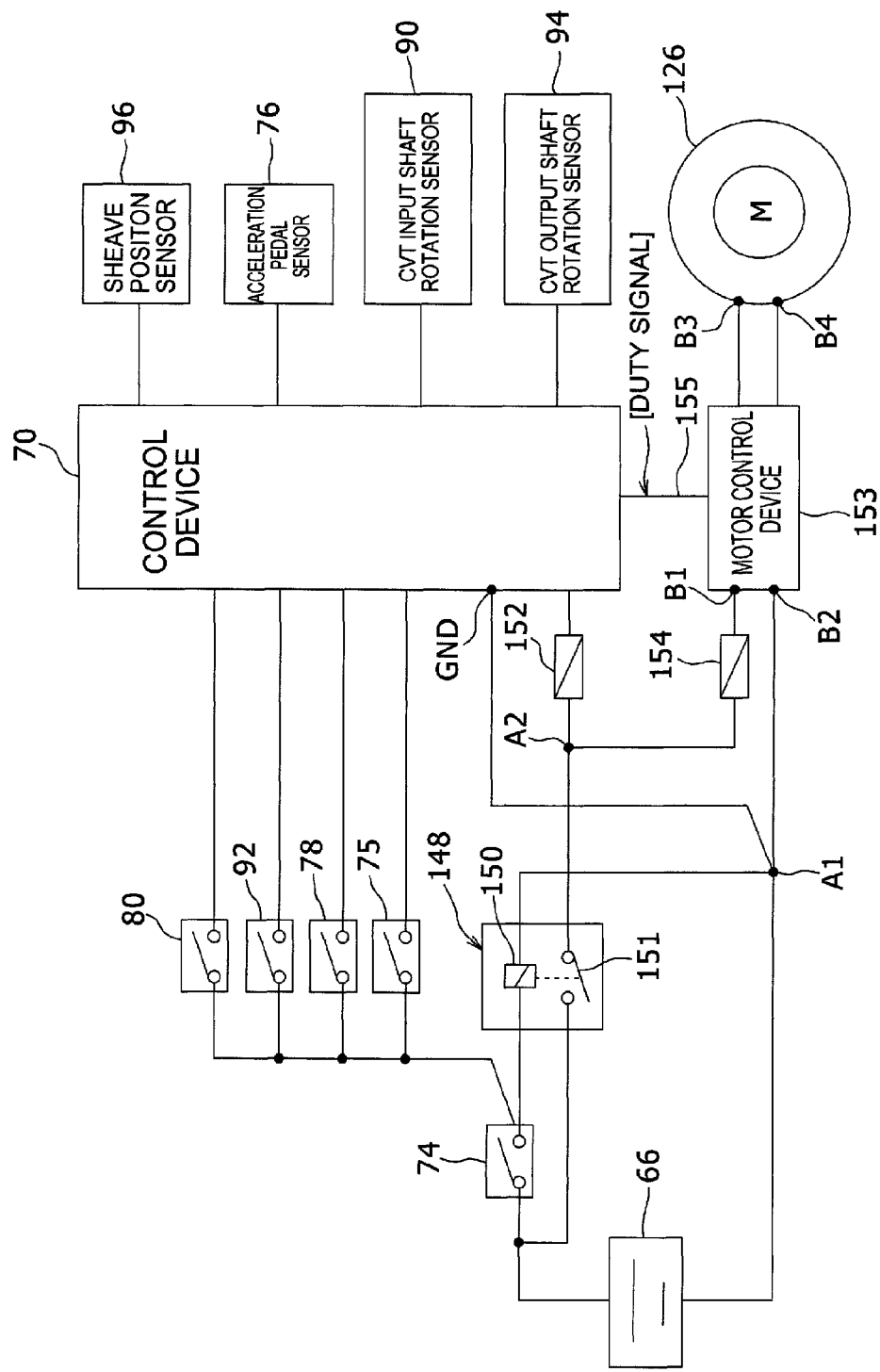
FIG. 17 is a diagram showing a second example configuration of a drive circuit of an electric motor forming the electricity-driven actuator in a continuously variable transmission control system according to a preferred embodiment of the present invention.

In the drive circuit of the second configuration shown in FIG. 17, a structure is employed in which, in the circuit of FIG. 16, a motor control device 153 is provided separately from the control device 70. A cathode connection terminal B1 of the motor control device 153 is connected to a connection point A2 between the switch body 151 of the power feed relay 148 and the fuse 152 through a second fuse 154. An anode connection terminal B2 of the motor control device 153 is connected to the connection point A1. A duty signal is transmitted from the control device 70 to the motor control device 153 through a signal line 155, and the electric motor 126 is rotated in one direction or in the other direction according to the duty signal. In this case, for example, in the motor control device 153, two switching elements which are connected in series may be provided on each of two arms which are connected in parallel, and points between the two switching elements in the two arms may be connected to two connection terminals B3 and B4 of the electric motor 126, respectively, to form H bridge circuits along with the electric motor 126. In this case, by the duty signal for controlling switching ON/OFF of the switching elements of the arms being transmitted by the signal line 155 from the control device 70 to the motor control device 153, the electric motor 126 rotates in the one direction or in the other direction. The example configuration of FIG. 17 is effective when the control device 70 does not have a function of the motor controller.

Figure 18:
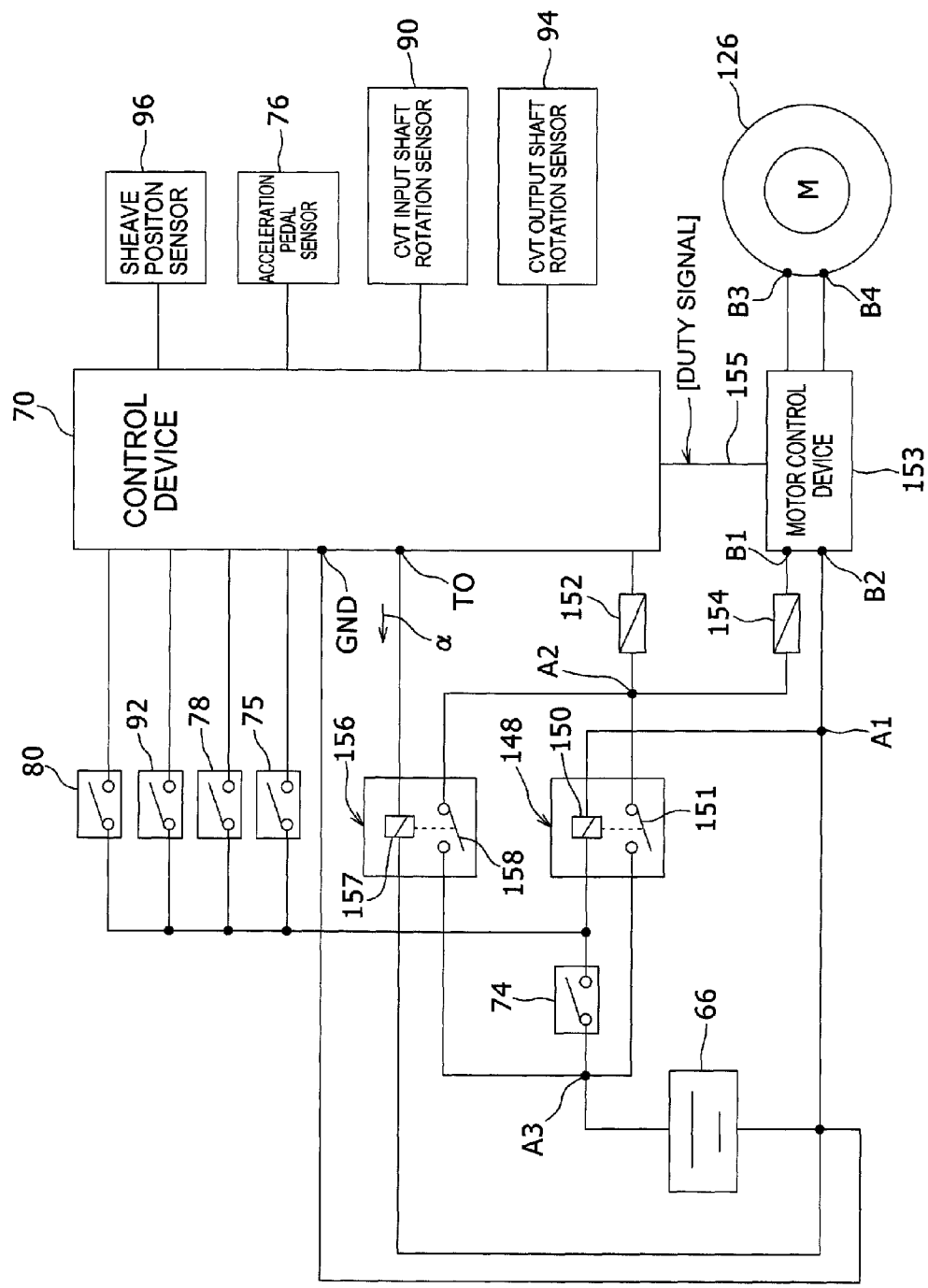
FIG. 18 is a diagram showing a third example configuration of a drive circuit of an electric motor forming the electricity-driven actuator in a continuously variable transmission control system according to a preferred embodiment of the present invention.

A drive circuit of the third configuration shown in FIG. 18 has a structure in which, in the drive circuit of FIG. 17, a coil 157 that forms a self-holding relay 156 is connected between the anode of the battery 66 and an output signal terminal T0 of the control device 70. One connection terminal of a switch body 158 of the self-holding relay 156 is connected to a connection point A3 between the key switch 74 and the cathode of the battery 66. The other connection terminal of the switch body 158 is connected to a connection point A2 between the switch body 151 of the power feed relay 148 and the fuses 152 and 154.

In this case, when the key switch 74 is switched ON, the power is fed from the battery 66 to the control device 70 through the power feed relay 148, and the control device 70 is activated. Then, an ON command signal, which is a voltage signal, is transmitted from the output signal terminal T0 to the self-holding relay 156 in a direction of an arrow a, and the switch body 158 of the self-holding relay 156 is switched ON. In this state, the power is fed from the battery 66 to the control device 70 not through the key switch 74, but through the self-holding relay 156.

On the other hand, the control device 70 disconnects the transmission of the ON command signal from the output signal terminal T0 to the self-holding relay 156 only when a "predetermined activation stop condition" which is set in advance is satisfied. The "predetermined activation stop condition" is satisfied, for example, when the engine rotational speed transmitted from the CVT input shaft rotation sensor 90 is 0, the rotational speed of the driven pulley 98 transmitted from the CVT output shaft rotation sensor 94 is 0, and the rotational speed of the wheel is 0, and is not satisfied in other cases. In the structures described above with reference to FIGS. 13 and 14, the predetermined activation stop condition may further include that the first moveable sheave 110 is at the belt release position P1 (FIG. 13(B)), determined based on the detection signal from the sheave position sensor 96.

According to the above-described configuration, even when the user has erroneously switched the key switch 74 OFF during traveling of the vehicle 10 or during the engine driving, the activation of the control device 70 is not stopped.

Figure 19:
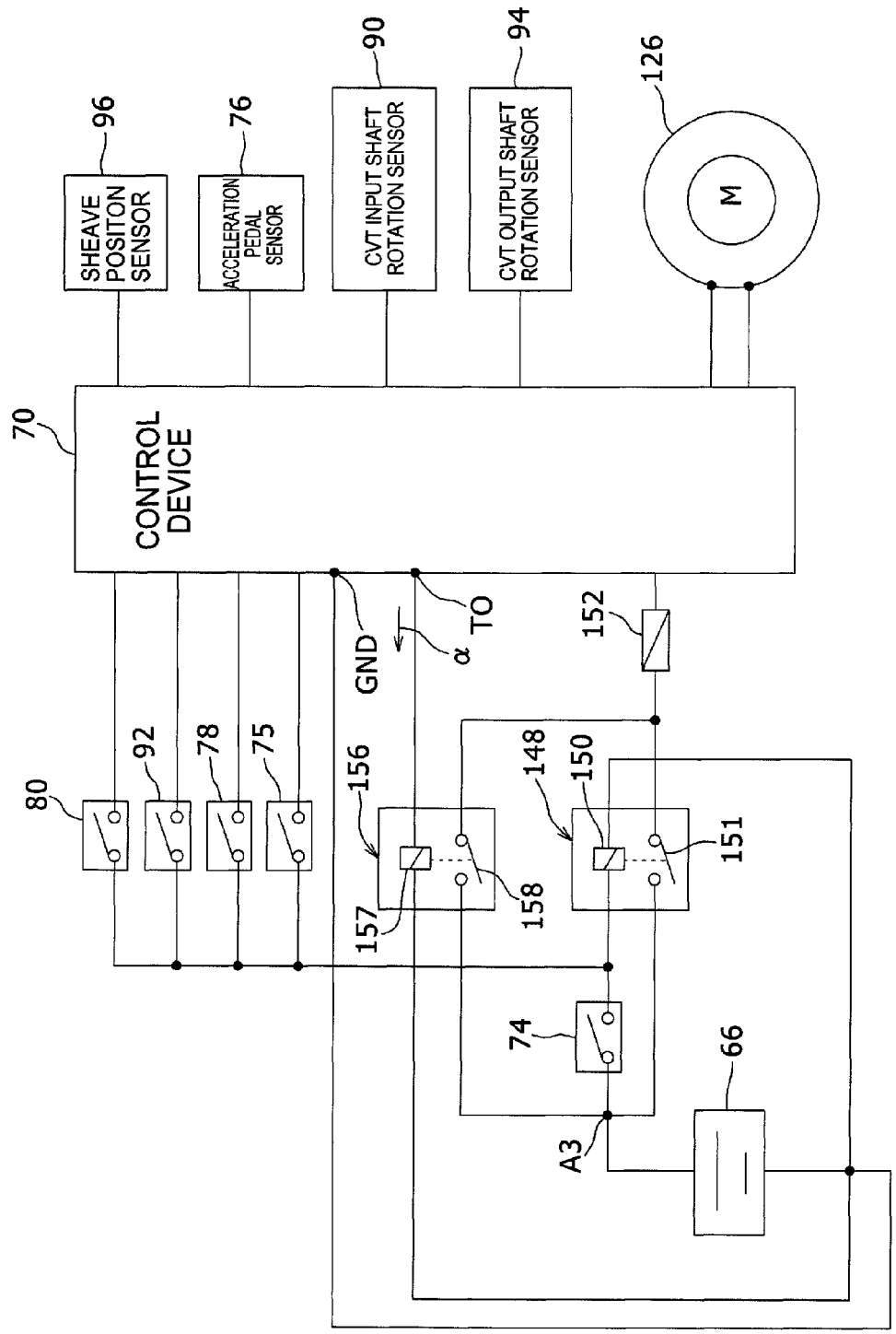
FIG. 19 is a diagram showing a fourth example configuration of a drive circuit of an electric motor forming the electricity-driven actuator in a continuously variable transmission control system according to a preferred embodiment of the present invention.

A drive circuit of the fourth configuration shown in FIG. 19 has a structure in which, in the drive circuit of FIG. 16, the self-holding relay 156 of the drive circuit of FIG. 18 is connected between the battery 66 and the control device 70. The function of the self-holding relay 156 is similar to that of FIG. 18.

Figure 20:
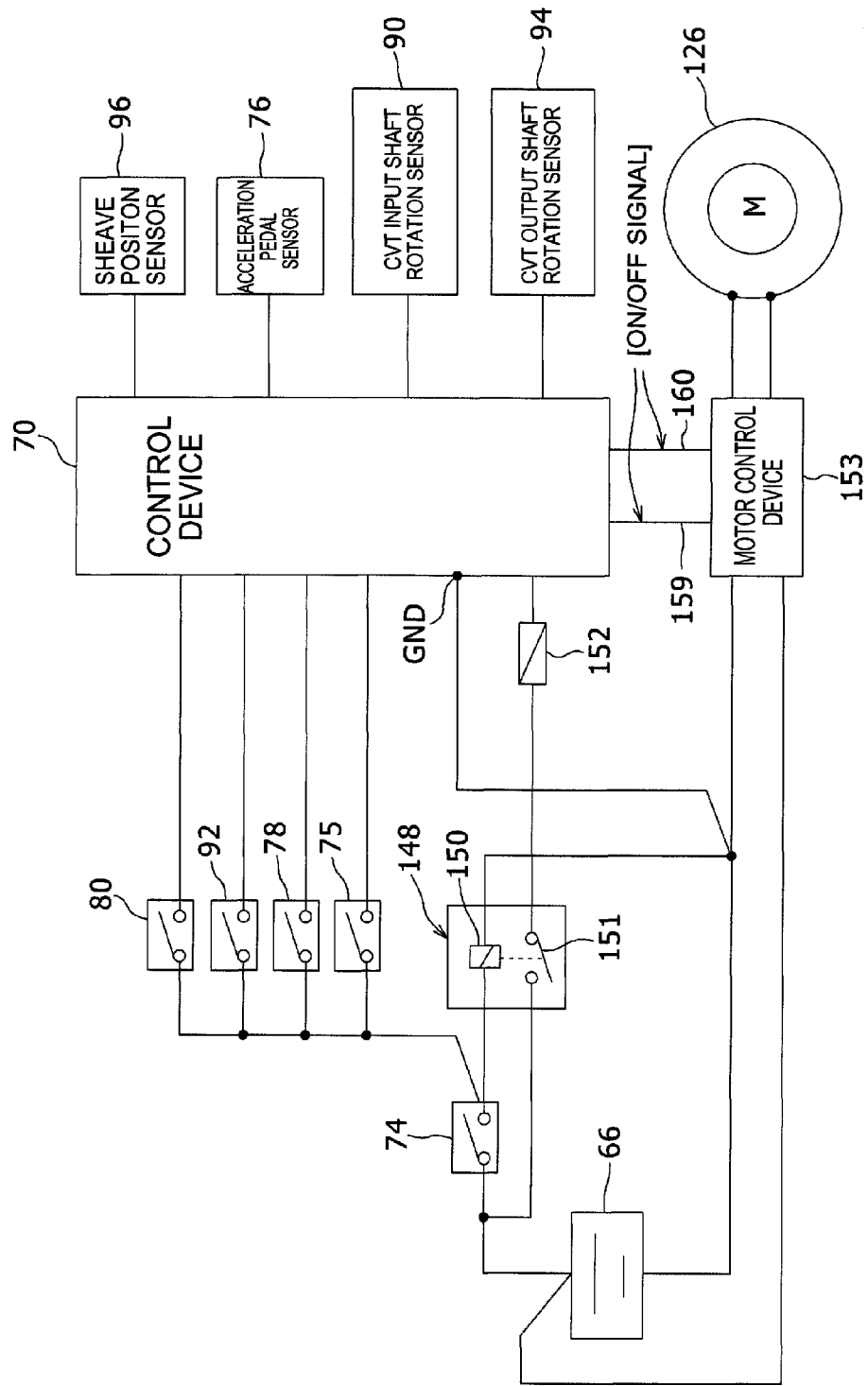
FIG. 20 is a diagram showing a fifth example configuration of a drive circuit of an electric motor forming the electricity-driven actuator in a continuously variable transmission control system according to a preferred embodiment of the present invention.

A drive circuit of the fifth configuration shown in FIG. 20 has a structure in which, in the drive circuit of FIG. 17, the cathode and the anode of the battery 66 are connected to the motor control device 153 not through the power feed relay 148, and ON/OFF signals representing the ON/OFF state are transmitted on two signal lines 159 and 160, from the control device 70 to the motor control device 153. When the ON signal is transmitted only to one signal line 159 of the two signals lines 159 and 160, the motor control device 153 controls the electric motor 126 to rotate in one direction. When the ON signal is transmitted only to the other signal line 160 of the two signal lines 159 and 160, the motor control device 153 controls the electric motor 126 to rotate in the other direction.

Figure 21:
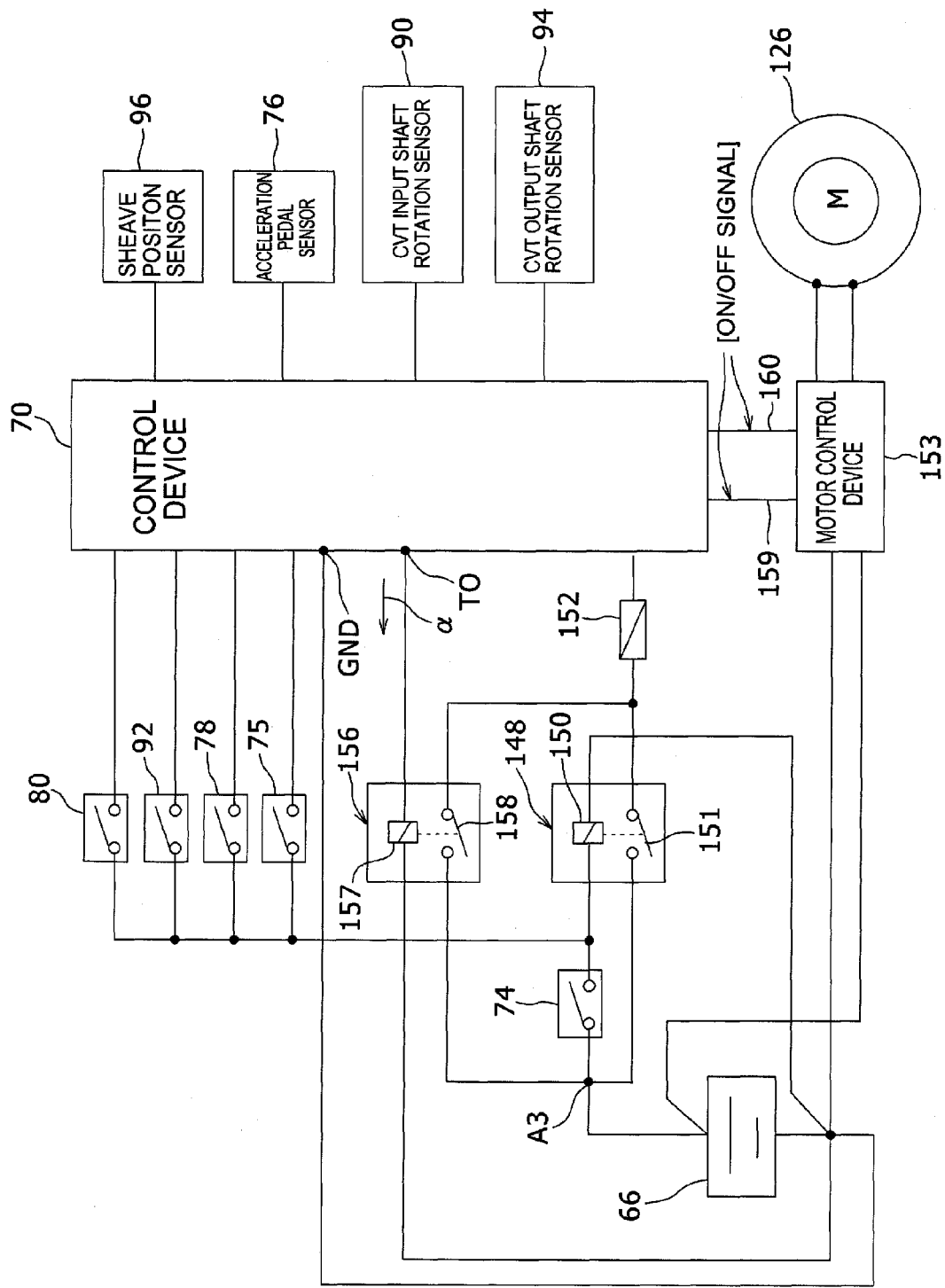
FIG. 21 is a diagram showing a sixth example configuration of a drive circuit of an electric motor forming the electricity-driven actuator in a continuously variable transmission control system according to a preferred embodiment of the present invention.

A drive circuit of the sixth configuration shown in FIG. 21 has a structure in which in the drive circuit of FIG. 20, the self-holding relay 156 of the drive circuit of FIG. 18 is connected between the battery 66 and the control device 70. The function of the self-holding relay 156 is similar to that of FIG. 18.

In the above-described configurations, it is sufficient that the control device has a structure to move the moveable sheave in the axial direction using the electricity-driven actuator so that the reduction ratio of the continuously variable transmission device is reduced as the amount of operation of the acceleration operation unit is increased at least in a predetermined operation amount range, and various structures may be employed within the scope of the present invention. In addition, the structure of the continuously variable transmission device is not limited to the structure of FIG. 3, and various structures may be employed within the scope of the present invention. For example, the electricity-driven actuator may be provided on the driven pulley side, of the driving pulley and the driven pulley, or on both the driving and driven pulleys, to move the moveable sheave in the axial direction.

The continuously variable transmission control device for a vehicle according to at least one of the above-described configurations has a structure of the continuously variable transmission control system for a vehicle according to the present invention. Because of this, the fuel consumption of the vehicle equipped with the belt type continuously variable transmission device can be improved, and the degree of freedom of setting the acceleration characteristic can be improved.

What is claimed is:

1. A continuously variable transmission control system for a vehicle, comprising:
    a continuously variable transmission device having a belt bridged over a driving pulley on a side of a motive power source and a driven pulley on a side of a wheel, and an electricity-driven actuator that moves a moveable sheave of at least one of the driving pulley and the driven pulley in the axial direction, to change a width between the moveable sheave and a fixed sheave;
    a control device that controls driving of the electricity-driven actuator; and
    an acceleration operation detection unit that detects an operation state of an acceleration operation unit, wherein
    the control device
        moves the moveable sheave in the axial direction using the electricity-driven actuator so that a reduction ratio of the continuously variable transmission device is reduced as an amount of operation of the acceleration operation unit is increased at least in a predetermined operation amount range,
        according to acquisition of a switching command signal that commands switching between a two-wheel drive and a four-wheel drive, sets a two-wheel drive predetermined reduction ratio or a four-wheel drive predetermined reduction ratio that is greater than the two-wheel drive predetermined reduction ratio, and
        regulates a movement range of the moveable sheave so that a minimum reduction ratio of the continuously variable transmission device is set at the set predetermined reduction ratio.

2. The continuously variable transmission control system for a vehicle according to claim 1, further comprising:
    a transmission operation detection unit that detects an operation position of a transmission command unit which can switch an operation position between at least two positions, and that transmits a detection signal to the control device, wherein
    the control device regulates a movement range of the moveable sheave so that a minimum reduction ratio of the continuously variable transmission device is a set to a predetermined reduction ratio which is set according to an operation position of the transmission command unit.

3. The continuously variable transmission control system for a vehicle according to claim 1, wherein the control device controls the electricity-driven actuator such that pinching of the belt between the moveable sheave and the fixed sheave in one pulley is released when a predetermined stop condition which is set in advance is satisfied, and the belt is pinched between the moveable sheave and the fixed sheave in the one pulley when a predetermined startup condition which is set in advance, and which includes a condition that the acceleration operation unit is operated, is satisfied.

4. The continuously variable transmission control system according to claim 3, further comprising:

an inclination detection unit that detects whether or not the vehicle is in a hill-climbing state of a hill road having an inclination angle of a predetermined angle or greater, wherein the control device controls the electricity-driven actuator such that the reduction ratio of the continuously variable transmission device at an initial stage of the startup is greater compared to an initial stage of startup other than the hill-climbing state when the predetermined startup condition is satisfied and it is judged that the vehicle is in the hill-climbing state.

\* \* \* \* \*